US010880292B2

(12) United States Patent
Koottayi et al.

(10) Patent No.: US 10,880,292 B2
(45) Date of Patent: Dec. 29, 2020

(54) SEAMLESS TRANSITION BETWEEN WEB AND API RESOURCE ACCESS

(71) Applicant: Oracle International Corporation, Redwood Shores, CA (US)

(72) Inventors: Vipin Anaparakkal Koottayi, Kerala (IN); Stephen Mathew, Karnataka (IN)

(73) Assignee: Oracle International Corporation, Redwood Shores, CA (US)

(*) Notice: Subject to any disclaimer, the term of this patent is extended or adjusted under 35 U.S.C. 154(b) by 215 days.

(21) Appl. No.: 16/022,068

(22) Filed: Jun. 28, 2018

(65) Prior Publication Data

US 2020/0007531 A1 Jan. 2, 2020

(51) Int. Cl.
*H04L 29/06* (2006.01)
*H04L 29/08* (2006.01)

(52) U.S. Cl.
CPC ........ *H04L 63/0815* (2013.01); *H04L 63/083* (2013.01); *H04L 67/141* (2013.01); *H04L 67/146* (2013.01); *H04L 63/0807* (2013.01)

(58) Field of Classification Search
CPC ... H04L 67/146; H04L 67/141; H04L 67/102; H04L 67/16; H04L 67/10; H04L 63/08; H04L 63/0815; H04L 63/10; H04L 63/123; H04L 9/32; H04L 9/3213; H04L 9/3247; H04L 9/3234; H04L 63/0807; H04L 63/102; H04L 63/0853
See application file for complete search history.

(56) References Cited

U.S. PATENT DOCUMENTS

| 8,370,914 | B2 | 2/2013 | Dalzell et al. |
| 8,955,037 | B2 | 2/2015 | Srinivasan et al. |
| 9,106,642 | B1 | 8/2015 | Bhimanaik |
| 9,208,298 | B2 | 12/2015 | McCoy et al. |

(Continued)

FOREIGN PATENT DOCUMENTS

WO  2014197248  12/2014

OTHER PUBLICATIONS

"Migrating APIs to HTTPS", Available online at https://https.cio.gov/apis/, Oct. 23, 2017, 7 pages.

(Continued)

*Primary Examiner* — Kristine L Kincaid
*Assistant Examiner* — Shaqueal D Wade
(74) *Attorney, Agent, or Firm* — Kilpatrick Townsend & Stockton LLP

(57) ABSTRACT

The present disclosure relates generally to access control, and more particularly, to techniques for seamless transition between world wide web (WEB) resource access and application programming interface (API) resource access on an enterprise network with security restrictions. One technique includes receiving a request for access to a first resource, determining the first resource is a WEB resource, creating an authentication cookie and a bearer token that are tied together using a common identifier, and providing access to the WEB resource based on the authentication cookie. The technique may further include receiving a call for access to a second resource, where the call includes the bearer token in a header of the call, determining the second resource is an API resource, initiating a token exchange of the bearer token for an access token; and providing access to the API resource based on the access token.

20 Claims, 9 Drawing Sheets

(56) References Cited

U.S. PATENT DOCUMENTS

| | | | |
|---|---|---|---|
| 9,225,711 B1 | 12/2015 | Sorensen | |
| 9,438,588 B2 | 9/2016 | Yefimov et al. | |
| 2005/0165859 A1* | 7/2005 | Geyer | G06Q 10/10 |
| 2010/0299716 A1* | 11/2010 | Rouskov | H04L 9/3271 |
| | | | 726/1 |
| 2015/0341334 A1 | 11/2015 | Bhimanaik | |
| 2016/0150028 A1* | 5/2016 | Klinger | H04L 67/10 |
| | | | 709/217 |
| 2019/0057204 A1* | 2/2019 | Marcovecchio | G06F 21/335 |
| 2019/0372993 A1* | 12/2019 | Dunjic | H04L 63/10 |
| 2019/0394187 A1* | 12/2019 | Fletcher | H04L 63/0807 |

OTHER PUBLICATIONS

"Solutions for Web and API Access Management", Available online at https://www.pingidentity.com/content/dam/ping-6-2-assets/Assets/solution-briefs/en/Solutions-for-Web-and-API-Access-Management.pdf, 2014, 3 pages.

Rosa, "Improving User Flow Through Page Transitions", Available online at https://www.smashingmagazine.com/2016/07/improving-user-flow-through-page-transitions/, Jul. 5, 2016, 16 pages.

* cited by examiner

SEAMLESS TRANSITION BETWEEN WEB AND API RESOURCE ACCESS

FIELD OF THE INVENTION

The present disclosure relates generally to access control, and more particularly, to techniques for seamless transition between world wide web (WEB) resource access and application programming interface (API) resource access on an enterprise network with single sign-on, or on various other service systems with security restrictions.

BACKGROUND

Enterprises such as companies and government agencies are increasingly faced with the challenge of opening their information technology infrastructure to grant customers and partners access to resources such as applications and data stored on their systems such as a distributed environment server. These enterprises also need to regulate user access to various data, keeping track of who has access to what. Enterprises increasingly rely on identity management solutions to improve application security and usability. However, conventional identity management solutions incorporated access management business logic directly into the application code. That is to say, each application would require users to have a separate account, separate policy logic, and separate permissions, for example. Furthermore, when a user is authenticated by one of these applications, this authentication remains unknown to other applications in the enterprise because the fact that authentication with the first application has taken place is not shared. Thus, there is no concept of trust between applications using different systems for authentication and access control. Developers quickly realized that having an access management system for each application in an enterprise was inefficient, and determined that authentication and access control would be more efficiently implemented and managed as a shared resource. These shared resources became known as access management systems.

Access management systems often use policies and other business logic to make a determination regarding whether a particular access request should be granted to a particular resource. Upon making a determination that access should be granted, a token is provided to a client (e.g., client application at a device) of the requestor. This token is like a key that can be used to open a door that guards restricted data. For example, a user may attempt to access a human resources database to gather information about certain employees such as salary information. The user's web browser at a client makes a request to the application, which requires authentication. If the web browser does not have a token, the user is asked to log in to the access management system. When the user is authenticated, the user's browser at the client receives a token that may be used to access the human resources application.

In an enterprise, users (e.g., employees) typically may have access to one or more different systems and applications. Each of these systems and applications may utilize different access control policies and require different credentials (e.g., user names and passwords). A user wanting to access multiple resources protected by an access management system may need to be authenticated by credentials provided to the access management system. A successful authentication gives the user authorization to access the protected resources, based on their assigned access privileges. Upon authentication, the access management system may establish a session ("user session") to provide the access granted to the protected resource(s). For a user session, the access management system may maintain session information at a computing system (e.g., server computer) for the user session. The session information maintained by access management system may be referred to as a server-side session. The access management system may store session information for the server-side session that defines the access granted to the user and the constraints of the session. The session information for a server-side session may be mapped to a client which is provided with a token. In the instance where a single sign-on (SSO) session is established, the access management system enforces access for SSO based on the token.

If a user wants to access multiple resources protected by the access management system, the access management system may determine whether the user is authenticated to access the multiple resources. In some instances, authentication of the user for one resource may suffice for accessing other resources, otherwise the access management system may request additional credentials from the user. Upon authentication to access multiple resources, the user may not need to re-authenticate to access additional resources. In such instances, the access management system may maintain a single session, such as a SSO, that provides a user with access to multiple resources after authentication. Some access management systems may utilize different storage techniques to manage (e.g., create, read, update, or delete operations) session information for a session. Session information may include information about the user and the user session for which the user is authenticated. Managing session information may include accessing an identity store to query information about user. After authentication of the user to establish a session, the access management system may update session information for subsequent accesses to a resource. Subsequent accesses may result in determining authorization and/or performing additional authentication (e.g., step-up authentication), either of which cause session information to be updated. Due to the difference in semantics of accessing various sources of resources (e.g., accessing a resource using a WEB Uniform Resource Locator (URL) versus accessing a resource using an API URL), the transition between the various sources for resource access is not conventionally seamless. New techniques are desired for controlling access to resources accessible in a distributed environment. Further desired are techniques for seamless transition between various sources for resource access.

BRIEF SUMMARY

Systems, methods and computer-readable memory for controlling access to resources accessible in a distributed environment are described. Certain techniques are described for seamless transition between WEB resource access and API resource access on an enterprise network with single sign-on, or on various other service systems with security restrictions.

In various embodiments, a method is provided comprising receiving, at a computing system, a request for access to a first resource; determining, by the computing system, the first resource is a world wide web (WEB) resource based on a first resource pattern; validating, by the computing system, credentials of a user for access to the WEB resource, where the credentials are validated based on an authentication scheme associated with the WEB resource; upon validation of the credentials, creating, by the computing system, an authentication cookie and a bearer token, where the authentication cookie and the bearer token are tied together using a common identifier; providing, by the computing system, access to the WEB resource based on the authentication cookie; receiving, at the computing system, a call for access to a second resource, where the call includes the bearer token in a header of the call; determining, by the computing system, the second resource is an application programming interface (API) resource based on a second resource pattern; validating, by the computer system, the bearer token, where the bearer token is validated based on the common identifier in the bearer token matching the common identifier of the authentication cookie; upon validation of the bearer token initiating, by the computing system, a token exchange of the bearer token for an access token; and providing, by the computing system, access to the API resource based on the access token.

In some embodiments, the common identifier is a session identifier. Optionally, the method further includes upon validation of the credentials, creating, by the computing system, a session with the session identifier, where the providing access to the WEB resource and the providing access to the API resource occur in the session identified by the session identifier. In some embodiments, the method further includes determining, by the computing system, that the user is authorized to access the WEB resource. Optionally, the access token is a different token from the bearer token and does not include the common identifier.

In various embodiments, non-transitory computer-readable memory is provided for storing a plurality of instructions executable by one or more processors, the plurality of instructions comprising instructions that when executed by the one or more processors cause the one or more processors to perform processing comprising: receiving a request for access to a first resource; determining the first resource is a world wide web (WEB) resource based on a first resource pattern; validating credentials of a user for access to the WEB resource, where the credentials are validated based on an authentication scheme associated with the WEB resource; upon validation of the credentials, creating an authentication cookie and a bearer token, where the authentication cookie and the bearer token are tied together using a common identifier; providing access to the WEB resource based on the authentication cookie; receiving a call for access to a second resource, where the call includes the bearer token in a header of the call; determining the second resource is an application programming interface (API) resource based on a second resource pattern; validating the bearer token, where the bearer token is validated based on the common identifier in the bearer token matching the common identifier of the authentication cookie; upon validation of the bearer token initiating a token exchange of the bearer token for an access token; and providing access to the API resource based on the access token.

In some embodiments, the common identifier is a session identifier. Optionally, the processing further includes upon validation of the credentials, creating a session with the session identifier, where the providing access to the WEB resource and the providing access to the API resource occur in the session identified by the session identifier. In some embodiments, the processing further includes determining that the user is authorized to access the WEB resource. Optionally, the access token is a different token from the bearer token and does not include the common identifier.

In various embodiments, a system is provided comprising one or more processors; a memory coupled to the one or more processors, the memory storing a plurality of instructions executable by the one or more processors, the plurality of instructions comprising instructions that when executed by the one or more processors cause the one or more processors to perform processing comprising: receiving a request for access to a first resource; determining the first resource is a world wide web (WEB) resource based on a first resource pattern; validating credentials of a user for access to the WEB resource, where the credentials are validated based on an authentication scheme associated with the WEB resource; upon validation of the credentials, creating an authentication cookie and a bearer token, where the authentication cookie and the bearer token are tied together using a common identifier; providing access to the WEB resource based on the authentication cookie; receiving a call for access to a second resource, where the call includes the bearer token in a header of the call; determining the second resource is an application programming interface (API) resource based on a second resource pattern; validating the bearer token, where the bearer token is validated based on the common identifier in the bearer token matching the common identifier of the authentication cookie; upon validation of the bearer token initiating a token exchange of the bearer token for an access token; and providing access to the API resource based on the access token.

In some embodiments, the common identifier is a session identifier. Optionally, the processing further includes upon validation of the credentials, creating a session with the session identifier, where the providing access to the WEB resource and the providing access to the API resource occur in the session identified by the session identifier. In some embodiments, the processing further includes determining that the user is authorized to access the WEB resource. Optionally, the access token is a different token from the bearer token and does not include the common identifier.

In various embodiments, a method is provided comprising receiving, at a computing system, a first call for a bearer token; validating, by the computing system, credentials of a user for access to the bearer token, where the credentials are validated based on an authentication scheme associated with the bearer token; upon validation of the credentials, creating, by the computing system, a bearer token, where the bearer token includes a common identifier; receiving, at the computing system, a second call for access to a first resource, where the second call includes the bearer token in a header of the call; determining, by the computing system, the first resource is an application programming interface (API) resource based on a first resource pattern; validating, by the computer system, the bearer token, where the bearer token is validated based on the common identifier in the bearer token; upon validation of the bearer token initiating, by the computing system, a token exchange of the bearer token for an access token; providing, by the computing system, access to the API resource based on the access token; receiving, at the computing system, a request for access to a second resource, where the request includes the bearer token in a header of the request; determining, by the computing system, the second resource is a world wide web (WEB) resource based on a second resource pattern; validating, by the computer system, the bearer token, where the bearer token is validated based on the common identifier in the bearer token; upon validation of the bearer token, creating, by the computing system, an authentication cookie, where the authentication cookie and the bearer token are tied together using the common identifier; and providing, by the computing system, access to the WEB resource based on the authentication cookie.

In some embodiments, the common identifier is a session identifier. Optionally, the method further includes upon validation of the credentials, creating, by the computing system, a session with the session identifier, where the providing access to the WEB resource and the providing access to the API resource occur in the session identified by the session identifier. In some embodiments, the method further includes determining, by the computing system, that the user is authorized to access the WEB resource. Optionally, the access token is a different token from the bearer token and does not include the common identifier. In some embodiments, the validating the bearer token for access to the WEB resource is an implicit authenticate process of the user for access to the WEB resource and includes determining that the WEB resource is protected.

The foregoing, together with other features and embodiments will become more apparent upon referring to the following specification, claims, and accompanying drawings.

DETAILED DESCRIPTION

Figure 1:
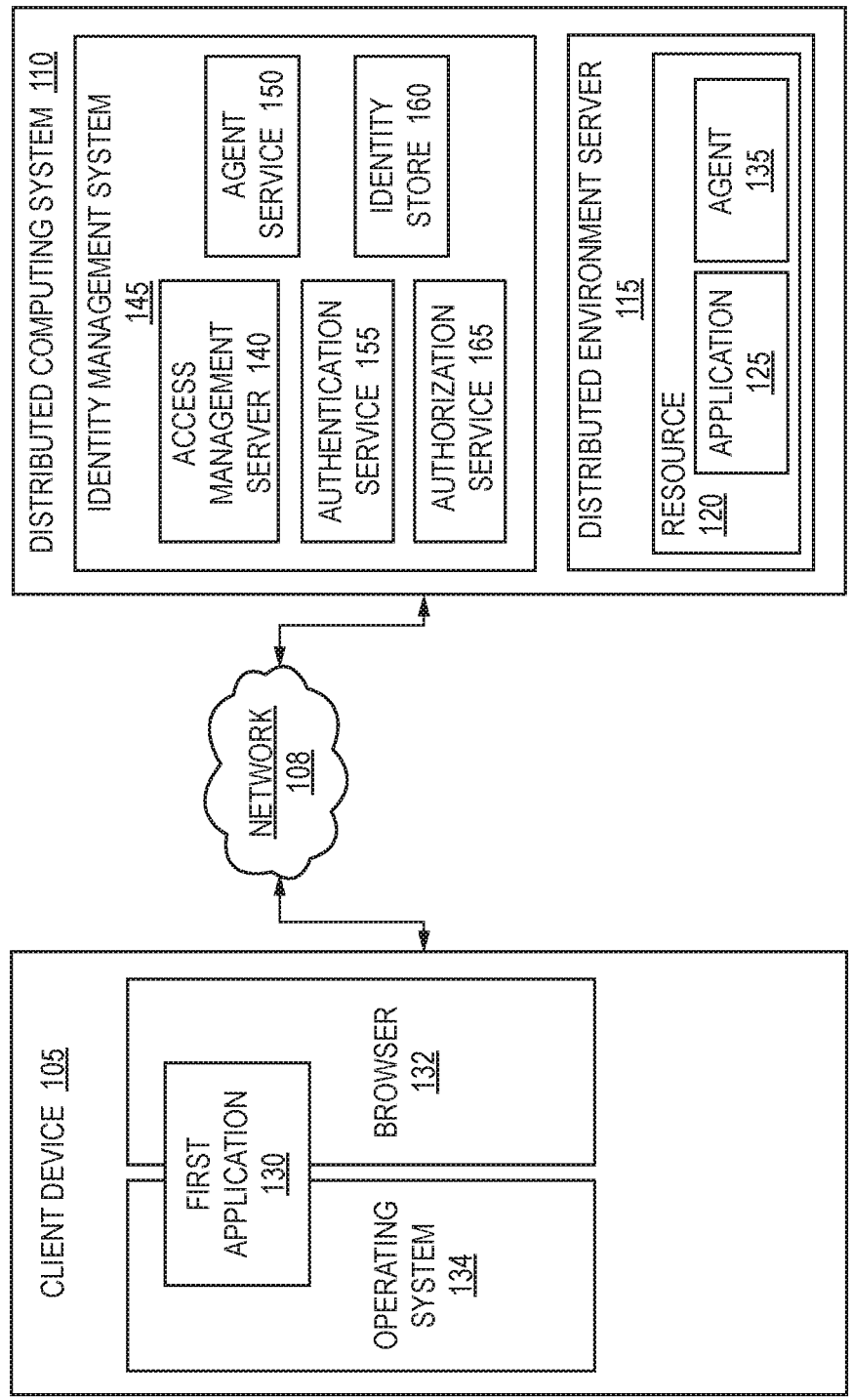
FIG. 1 illustrates a high-level diagram of a system for managing access to resources in accordance with various embodiments.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Introduction

An access manager provides authentication and authorization to various types of protected resources. Typically, an access request can be for WEB resources using a Uniform Resource Locator (URL) (e.g., WEB URL resources accessed in an Internet-based hypertext system) or can be for API resources (e.g., API resources accessed on a server that employs Representational State Transfer (REST) constraints (i.e., REST API resource)) using an endpoint URL and uniform and predefined set of stateless operations. WEB resource access may be initiated using web browsers or HTTP clients simulating a browser interaction model. Web browsers or HTTP clients may follow the redirects initiated by the access manager and the access manager can take the user-agent through a standard HTTP session based authentication. The basic processes for the standard HTTP session based authentication for access to WEB resources include the client sending credentials to the access manager for validation, the access manager validating the credentials, generating an authentication token, and creating a session with a session identifier stored in a cookie. The access manager may persist the session server-side and store the authentication token in a storage device with a user identifier for subsequent look up actions, and thus the standard HTTP session based authentication is considered stateful. The access manager then sends the authentication token to the client with the session cookie. Thereafter, each time the client requests access to the WEB resources, the client includes the authentication token in the request using the header of the session cookie. The access manager in each request, extracts the authentication token from the incoming session cookie, looks up the user identifier on its key/value and query database to obtain the user information, and grants WEB resource access.

In contrast to standard HTTP session based authentication, the basic processes for standard API based authentication for access to API resources (e.g., REST API resources) include the client sending credentials to the access manager for validation, the access manager validating the credentials, and the access manager generating a scoped access token. Scopes provide a way to limit the amount of access that is granted to an access token. For example, an access token issued to a client application may be granted READ and WRITE access to protected resources, or just READ access. A developer can implement their APIs to enforce any scope or combination of scopes they wish. So, if a client receives a token that has READ scope, and it tries to call an API endpoint that requires WRITE access, the call will fail. The access manager then sends the scoped access token to a client in a response body. The access manager does not persist the session server-side and does not store the scoped access token in a storage device with a user identifier for subsequent look up actions, and thus the standard API based authentication is considered stateless. Thereafter, the scoped access token is validated by the resource server each time before granting access to the resource. Scoped access tokens are validated with the authorization policies (typically placed at the very beginning of a proxy flow). The policy must have the VerifyAccessToken operation specified. For example, the policy may succeed only if the scoped access token includes scope "A". If this <Scope> element is omitted or if it has no value, then the policy ignores the scope of the access token. Granting resource access after doing validation of a scoped access token is preferred instead of sending the credential in every request in the form of basic authorization header. The latter has security implications since validation of access credentials is part of every request.

Due to the difference in processes and semantics of WEB resource access and API resource access, the transition of user access between WEB resource access and API resource access in not conventionally seamless. Specifically, the WEB client needs to send the authentication token with a session cookie created during the stateful authentication flow, whereas the API client needs to send a scoped access token created during the stateless authentication flow. Moreover, API clients cannot follow redirects like the browser of a WEB client, and thus it is not feasible to enforce a session before access is granted to the resource server of an API.

To address these problems and provide an improved system to seamlessly transition between WEB resource access and API resource access, a method is provided comprising a method is provided comprising receiving, at a computing system, a request for access to a first resource; determining, by the computing system, the first resource is a world wide web (WEB) resource based on a first resource pattern; validating, by the computing system, credentials of a user for access to the WEB resource, where the credentials are validated based on an authentication scheme associated with the WEB resource; upon validation of the credentials, creating, by the computing system, an authentication cookie and a bearer token, where the authentication cookie and the bearer token are tied together using a common identifier; providing, by the computing system, access to the WEB resource based on the authentication cookie; receiving, at the computing system, a call for access to a second resource, where the call includes the bearer token in a header of the call; determining, by the computing system, the second resource is an application programming interface (API) resource based on a second resource pattern; validating, by the computer system, the bearer token, where the bearer token is validated based on the common identifier in the bearer token matching the common identifier of the authentication cookie; upon validation of the bearer token initiating, by the computing system, a token exchange of the bearer token for an access token; and providing, by the computing system, access to the API resource based on the access token. As used herein, when an action is "triggered by" or "based on" something, this means the action is triggered or based at least in part on at least a part of the something.

Alternatively, a method is provided comprising receiving, at a computing system, a first call for a bearer token; validating, by the computing system, credentials of a user for access to the bearer token, where the credentials are validated based on an authentication scheme associated with the bearer token; upon validation of the credentials, creating, by the computing system, a bearer token, where the bearer token includes a common identifier; receiving, at the computing system, a second call for access to a first resource, where the second call includes the bearer token in a header of the call; determining, by the computing system, the first resource is an application programming interface (API) resource based on a first resource pattern; validating, by the computer system, the bearer token, where the bearer token is validated based on the common identifier in the bearer token; upon validation of the bearer token initiating, by the computing system, a token exchange of the bearer token for an access token; providing, by the computing system, access to the API resource based on the access token; receiving, at the computing system, a request for access to a second resource, where the request includes the bearer token in a header of the request; determining, by the computing system, the second resource is a world wide web (WEB) resource based on a second resource pattern; validating, by the computer system, the bearer token, where the bearer token is validated based on the common identifier in the bearer token; upon validation of the bearer token, creating, by the computing system, an authentication cookie, where the authentication cookie and the bearer token are tied together using the common identifier; and providing, by the computing system, access to the WEB resource based on the authentication cookie.

Advantageously, the proposed solution does not require a second log-in process (e.g., an authentication process) for access to the WEB resource or the API resource once the user has already accessed a previous WEB resource or API resource, and thus transitioning between web resource access and API resource access is implicit. Additionally, each security agent is an intelligent protection agent for a host server and configured to differentiate between a WEB resource access request and an API resource access request. Even more advantageously, a specific and pointed solution like programmatic authentication is not required, and the token exchange and token revocation becomes the standardized model for transition between various types of resource access. Additionally, sending the encoded authorization header in every API request is a security risk, which is not required with the new solution.

Control Access System

The various embodiments described herein may be used in an assortment of different domains and contexts. Certain embodiments are particularly applicable to enterprise application software provided in cloud computing technology. However, the systems and methods described herein may be used to provide access control functionality for any system or application framework that relies on an access manager server for controlling access to resources in a distributed environment.

In some embodiments, systems, methods, and computer-readable media are disclosed for controlling access to resources accessible in a distributed environment. FIG. 1 illustrates a system 100 for managing access to resources in accordance with an exemplary embodiment. Specifically, system 100 provides access among different resources provided within a distributed environment. For example, a user operating a client device 105 may access a network 108 such as an enterprise computer network that includes a distributed computing system 110. The distributed computing system 110 may be implemented using a cloud computing infrastructure. In some embodiments, the distributed computing system 110 may include a distributed environment server 115 (e.g., a cloud server) that delivers content, computing power, and/or storage capacity as a service to user via a network. Resource 120 (e.g., application and data) is stored on the distributed environment server 115 in an instance that is accessible by the client device 105 via the network. Client device 105 may be a workstation, personal computer (PC), laptop computer, smart phone, wearable computer, or other networked electronic device.

Resource 120 may include, without restriction, a file, a web page, a document, web content, services, a computing resource, or an application. For example, system 100 may include resource 120 such as application 125 and/or content accessible through the application 125. A resource 120 may be requested and accessed using an application 130 (e.g., a first application) on client device 105. For example, the application 130 may request access to a web page from a resource server based on a URL identifying a requested resource. Resource 120 may be provided by one or more computing systems, e.g., a resource server such as distributed environment server 115 that provides access to one or more resources upon authentication of a user in the system 100. In some embodiments, the application 130 is a web application or web app, which is a client-server computer program that the client 105 (including the user interface and client-side logic) runs in a web browser 132. In other embodiments, the application 130 is a desktop or mobile application such as an enterprise application, which is a client side computer program that the client 105 (including the user interface and client-side logic) runs on an operating system 134, and may interface with external networks or servers via the browser 132 or other well-known interfaces.

An access management system may be implemented in system 100 according to an agent-server model for enabling communication between client device 105 and the distributed environment server 110 to provide access control functionality over resource 120. The agent-server model may include an agent component (e.g., security agent 135 also known as a single sign-on agent or policy-enforcement agent) and a server component (e.g., access manager server 140 also known as a single sign-on server or policy server). The security agent 135 may be deployed with the resource 120 as a plugin or as a portion of the resource 120, or the security agent 130 may be provisioned separate from the resource 120, for example, running on a web server in front of the resource 120. The access manager server 140 may be deployed as a part of an identity management system 145. The identity management system may further comprise agent service 150, authentication service 155, identity store 160, and authorization service 165.

The security agent 135 and the access manager server 140 may work in combination to provide user access control and protect resources within the enterprise computer network against external and internal web-based threats. For example, the access manager server 140 may serve as the decision component for controlling access to the resource 120, and the security agent 135 may implement or operate as the enforcement component for controlling access to the resource 120. In some embodiments, the security agent 135 may be application language binding specific, and thus, the security agent 135 could be used for protecting multiple applications written in the same language and sharing the same endpoints (e.g., uniform resource identifier (URI)).

The access management system enables authentication/authorization (e.g., single sign-on (SSO)) functionality within a distributed environment, and may perform various access control related functions for managing access to resources within the distributed environment. For example, security agent 135 and access manager server 140 may perform authentication (e.g., single level, single factor, multi-level, and/or multi-factor authentication) of a user operating the client device 105. Authentication is the process by which a user is verified to determine that he/she is who he/she claims to be. In some embodiments, the access management system receives a request from a user in response to the user sending the request to access management system from a client device. In other embodiments, the access management system receives a request from users in response to the access management system intercepting the request. To authenticate a user, the access management system (e.g., using security agent 135 and access manager server 140) may present a user with a request for authentication credentials in the form of a challenge (e.g., via the user's web browser or via another application). Authentication policies may specify the authentication methodology (e.g., level and/or factors) to be used for authenticating the user for whom the access must be provided on a given resource. The policies define the way in which the resource access is to be protected (e.g., type of encryption, or the like). For example, the rules of a policy may dictate that single or multi-factor authentication be performed that includes a possession factor authentication via a push notification. The access management system may further determine authorization of a user to access a resource. Authorization is the process of determining if a user has a right to access a requested resource. Authorization policies may be defined that specify the conditions under which a user or group of users has access to a resource. For example, an administrator may only authorize certain users within a group to access particular resources.

Figure 2:
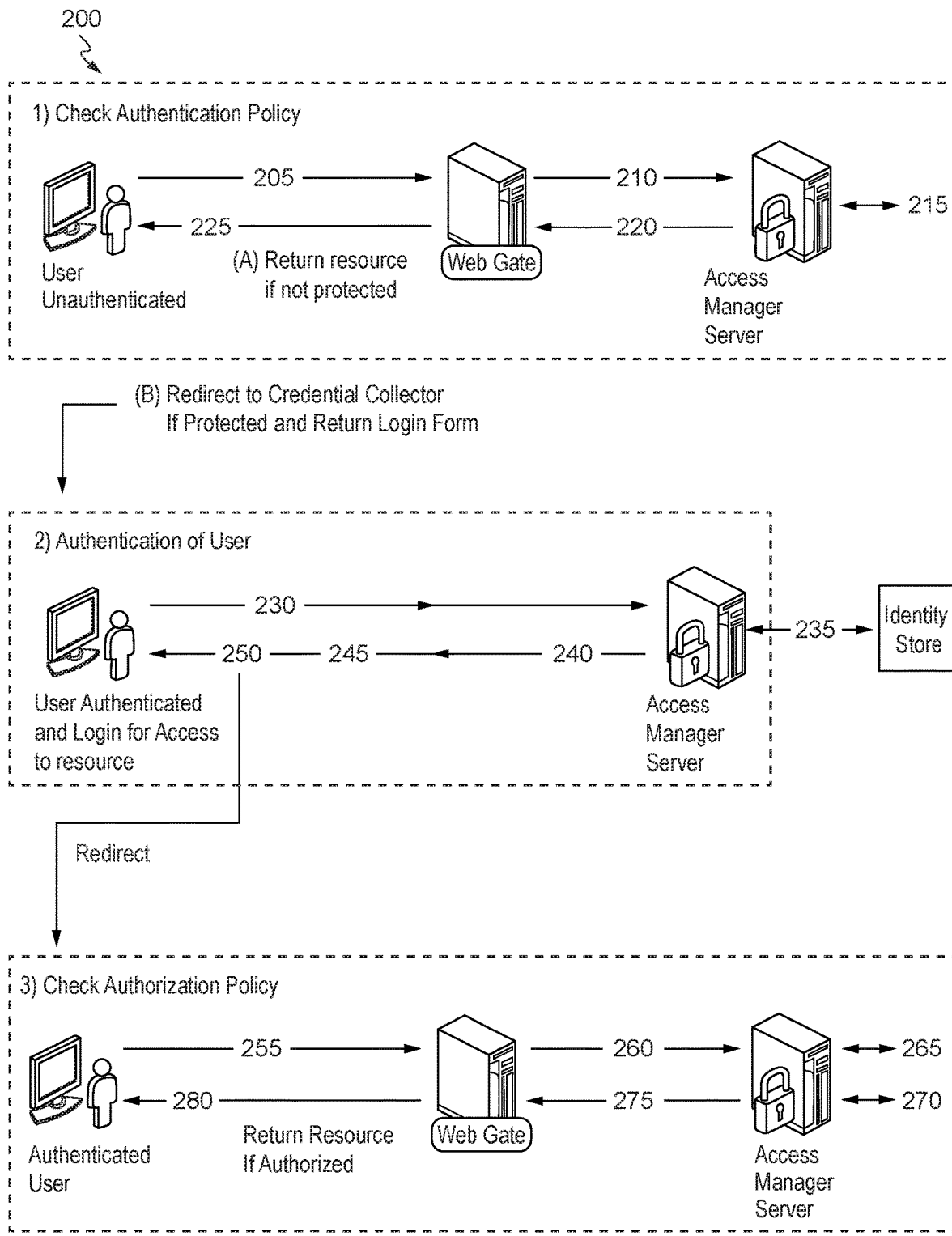
FIG. 2 illustrates an example of a typical SSO session managed within a distributed environment implementing an access management system comprising a security agent and access manager server in accordance with various embodiments.

FIG. 2 illustrates an example of a typical SSO session 200 managed within a distributed environment implementing an access management system comprising a security agent and access manager server, as described with respect to FIG. 1. In various embodiments, at step 205 a user may operate client device to request access (e.g., via a WEB URL or REST API) to a resource controlled by a distributed environment server. The request may be routed to or intercepted by a security agent (e.g., a webgate), which controls access to the resource. In some embodiments, at step 210 the security agent will query the access manager server to determine if the requested resource is protected. For example, the security agent may forward the request to the access manager server. The access manager server at step 215 checks relevant authentication policies for the resource to determine whether authentication is required for access to the resource, and if so how the authentication is performed. If the requested resource is protected and requires authentication for use, the access manager server may determine whether any session exists for the user by checking for the existence of a session cookie such as a SSO cookie. At step 220, the access manager server logs and returns the decision to the security agent. Upon determining, that a session has been established for the user and/or the resource is unprotected, the resource is served by the security agent to the user at step 225 (e.g., the security agent grants access for the client device to the resource on a host server). Upon determining that no session has been established for the user and the resource is protected, the user may be forwarded by the security agent to a login service (e.g., authentication service 155 as described with respect to FIG. 1) of the identity management system to start an authentication process. The authentication service may request authentication credentials (e.g., user name/password, accept or decline a push notification, or the like) from the user. For example, the authentication service may forward a login form to the client device based on the authentication policy to obtain the required authentication credentials from the user for the resource access. At step 230, the user may complete the log in form and send the credentials to the authentication service. The authentication service may authenticate the user upon receiving the proper authentication credentials by validating the credentials against those stored in a user directory or identity store, at step 235.

Based on receiving the proper authentication credentials for the user, at step 240, the access manager server may establish a SSO session for user, a session cookie, and an authentication token. The session cookie tracks session activity for the user. The cookie may include a length of time that the user has been active on a session. The cookie may be stored as session activity data within the identity management system. At step 245, the access manager server logs success or failure of credential validation. If the authentication process is a success, then at step 250 the authentication service may redirect the user back to the security agent, the security agent may check the authentication and create an authentication cookie using the authentication token, and as a result, the user is logged into the distributed environment server for the session. Once logged in, the user may access resources to which the user is authorized to access at step 255, such as running different applications, accessing cloud storage, or the like. If the authentication process is a failure, then the security agent notifies the client that the authorization failed (e.g., the user may be redirected to another URL determined by an administrator).

Upon determining that the user is authenticated for a SSO session, the security agent may process the original request for resource by redirecting, at step 260, an authorization query to the access manager server to start an authorization process. In some embodiments, the security agent prompts the access manager server to look up the authorization policies, compare the authorization policies to the user's identity, and determine the user's level of authorization. At step 265, the access manager server checks the session cookie to determine whether the session is active. At step 270, the access manager server checks relevant authorization policies for the resource to determine whether the user is authorized to access to the resource. The access manager server may evaluate the authorization policies in view of the determined user's level of authorization and cache the results. The access manager server may then at step 275 log the evaluation and return a policy decision to the security agent, for example, responds to the security agent with an allow or deny message based on the authorization policies. Upon determining that the user is allowed access to the resource, at step 280, the security agent allows the request from the client device for access to the resource to go through and the user can access the resource on the distributed environment server via client device. Upon determining that the user is denied access to the resource, the security agent notifies the client that access to the resource for the user is not permitted (e.g., the user may be redirected to another URL determined by an administrator).

Transition from WEB Resource Access to API Resource Access

Figure 3:
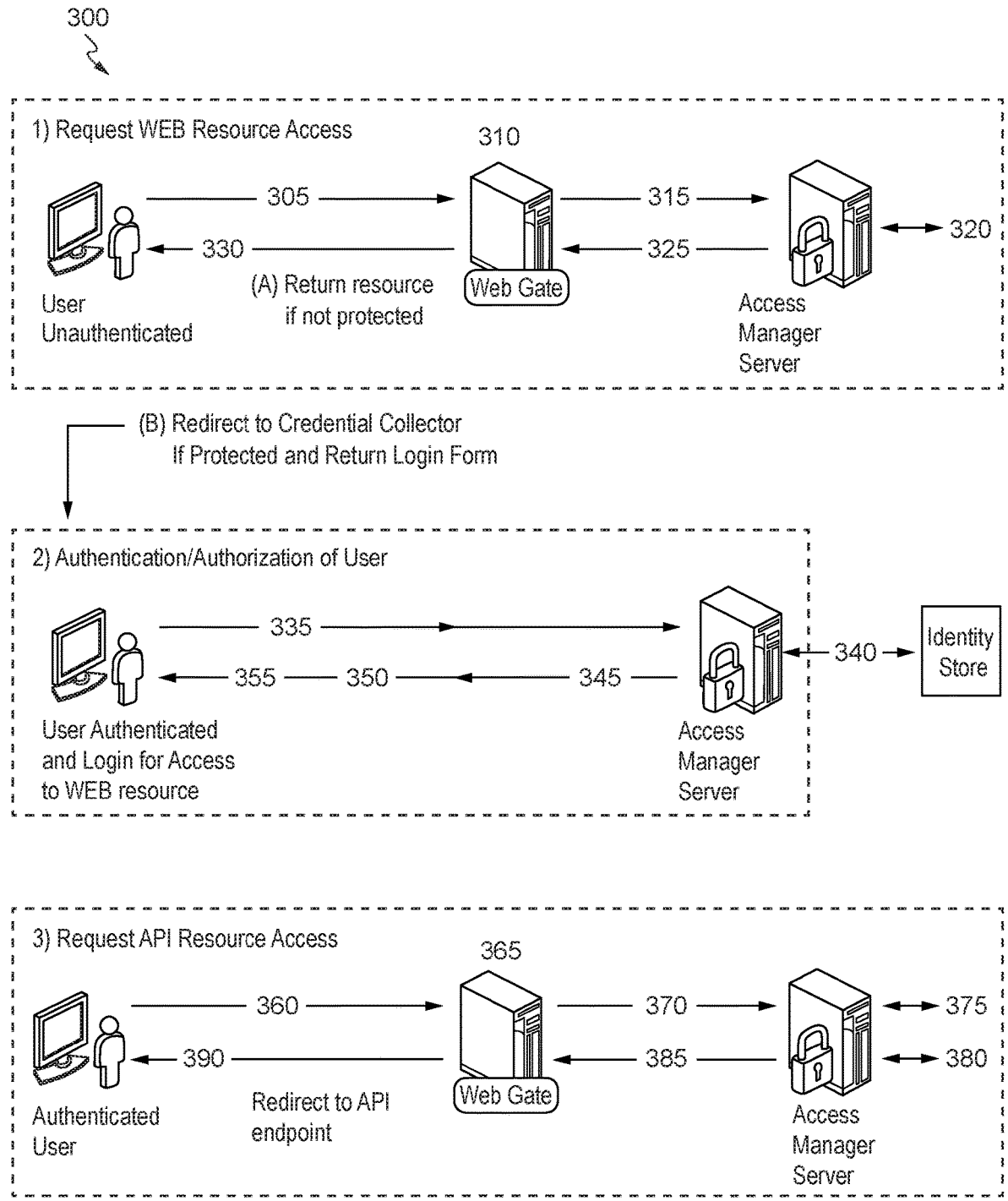
FIG. 3 illustrates an example of a transition from a WEB resource access to an API resource access within a distributed environment implementing an access management system comprising an agent component and an access manager server in accordance with various embodiments.

FIG. 3 illustrates an example 300 session of a transition from a WEB resource access to an API resource access within a distributed environment implementing an access management system comprising an agent component and an access manager server, as described with respect to FIG. 1. In various embodiments, at step 305 a user may operate client device to request access (e.g., via a WEB URL) to a first resource controlled by a distributed environment server. The request may be routed to or intercepted by a security agent (e.g., a webgate), which controls access to the resource. In some embodiments, at step 310 the security agent checks a resource pattern to determine whether the request is for a WEB resource access. If the access request is for a WEB resource access, the process continues at step 315 where the security agent queries the access manager server to determine if the WEB resource is protected. For example, the security agent may forward the request to the access manager server. If the access request is not for a WEB resource access, the process continues at step 365 to determine whether the access request is for an API resource access.

The access manager server at step 320 checks relevant authentication policies for the resource to determine whether authentication is required for access to the resource, and if so how the authentication is performed. If the requested resource is protected and requires authentication for use, the access manager server may determine whether any session exists for the user by checking for the existence of a session cookie such as a SSO cookie. At step 325, the access manager server logs and returns the decision to the security agent. Upon determining, that a session has been established for the user and/or the resource is unprotected, the resource is served by the security agent to the user at step 330 (e.g., the security agent grants access for the client device to the resource on a host server). Upon determining that no session has been established for the user and the resource is protected, the user may be forwarded by the security agent to a login service (e.g., authentication service 155 as described with respect to FIG. 1) of the identity management system to start an authentication process. The authentication service may request authentication credentials (e.g., user name/password, accept or decline a push notification, or the like) from the user. For example, the authentication service may forward a login form to the client device based on the authentication policy to obtain the required authentication credentials from the user for the resource access. At step 335, the user may complete the log in form and send the credentials to the authentication service. The authentication service may authenticate the user upon receiving the proper authentication credentials by validating the credentials against those stored in a user directory or identity store, at step 340.

Based on receiving the proper authentication credentials for the user, at step 345, the access manager server may establish a SSO session for user, a session cookie, and an authentication token. The session cookie tracks session activity for the user. The cookie may include a length of time that the user has been active on a session. The cookie may be stored as session activity data within the identity management system. In some embodiments, the access manager server also establishes a bearer token. The bearer token is a security token that grants the "bearer" access to the protected resource. The bearer token includes a claim or a common identifier (e.g., a session ID) such that the bearer token is linked to the session. At step 350, the access manager server logs success or failure of credential validation. If the authentication process is a success, then at step 350 the authentication service may redirect the user back to the security agent, the security agent may check the authentication and create an authentication cookie using the authentication token, and as a result, the user is logged into the distributed environment server for the session. The authentication cookie is established with the common identifier such that the authentication cookie and the bearer token are tied together. Once logged in, the user may access resources to which the user is authorized to access at step 355 (authorization may be processed as discussed with respect to FIGS. 1 and 2), such as running different applications, accessing cloud storage, or the like. If the authentication process is a failure, then the security agent notifies the client that the authorization failed (e.g., the user may be redirected to another URL determined by an administrator).

In various embodiments, at step 360 a user invokes (i.e., makes an API call) an endpoint of an API for access to a second resource (e.g., an API resource). In certain embodiments, the bearer token is included in the header of the API call. The call may be routed to or intercepted by a security agent (e.g., a webgate), which controls access to the resource. In some embodiments, at step 365 the security agent checks a resource pattern to determine whether the request is for an API resource access. If the access request is for an API resource access, the process continues at step 370 where the security agent initiates a token exchange process. If the access request is not for an API resource access, the process continues at step 310 to determine whether the access request is for a WEB resource access. At step 370, the security agent initiates a token exchange process by redirecting the call to the access management server to exchange the bearer token for an access token. In some embodiments, the security agent will redirect the call to an endpoint of the access management server (e.g., /authorize and /oauth/token). At the endpoint, the access management server will determine whether the bearer token is valid, at step 375. At step 380, if verification fails, the bearer token is considered invalid and access management server will send an unauthorized status code so that webgate or client may initiate a fresh login flow. At step 385, if the bearer token is valid, then the access management server will issue an access token and exchange the bearer token for the access token. The access token may be issued via the endpoint. The access token is a different token from the bearer token and does not include the common identifier. At step 390, the security agent initiates API resource access by redirecting the call with the access token to the end point of the API call. As should be understood, providing access to the WEB resource and providing access to the API resource occurs in the same session identified by the common identifier.

Figure 4:
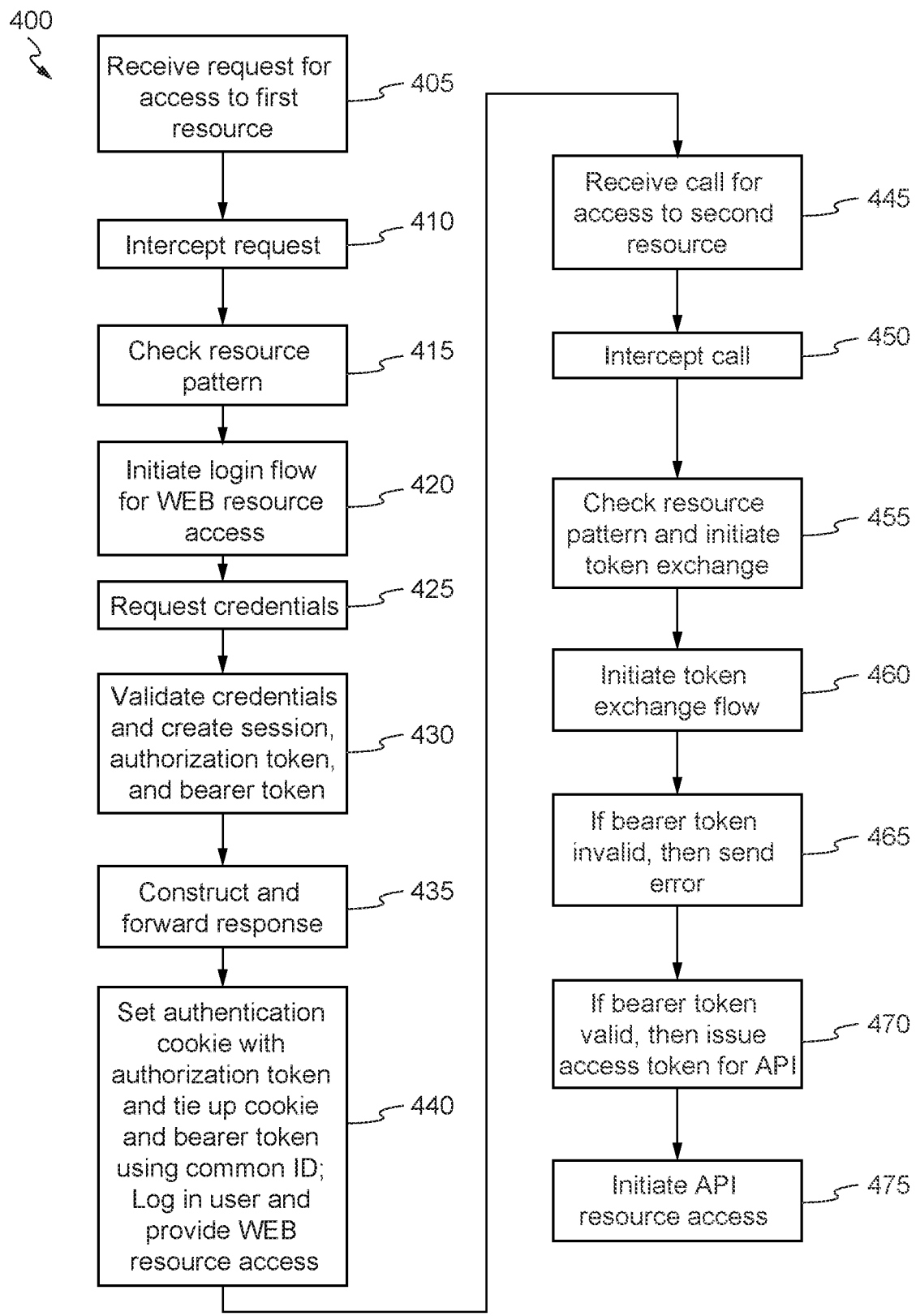
FIG. 4 depicts a flowchart illustrating a process for transitioning from WEB resource access to API resource access in accordance with various embodiments.

FIG. 4 illustrates a process and operation for accessing a WEB resource and subsequently accessing an API resource from a same access session (e.g., a SSO session) according to various embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIG. 4 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 4 is not intended to be limiting. Other sequences of steps may also be performed according to alternative embodiments. For example, in alternative embodiments the steps outlined above may be performed in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 4 shows a flowchart 400 that illustrates a process for accessing a WEB resource and subsequently accessing an API resource from a same access session (e.g., a SSO session) according to various embodiments. In some embodiments, the processes depicted in flowchart 400 may be implemented by the system of FIGS. 1, 2, and 3. At step 405, a user makes a request to access a first resource. For example, a user operating a client device (e.g., client device 105 discussed with respect to FIG. 1) may access a network such as an enterprise computer network that includes a distributed computing system. In some embodiments, the distributed computing system may include a distributed environment server (e.g., a cloud server) that delivers content, computing power, and/or storage capacity as a service to user via a network. The first resource (e.g., application and data) may be stored on the distributed environment server in an instance that is accessible by the client device via the network. In some embodiments, the first resource is a WEB resource. A WEB resource is anything that can be obtained from the World Wide Web. Some examples are web pages, e-mail, information from databases, and web services, A URL may be used to identify the first resource on a web page or website (collection of web pages) held by a host server (e.g., the distributed environment server) on the WEB. The web page or website may be accessed via the URL by the user making a Hypertext Transfer Protocol (HTTP) request to access the first resource on the web server using an agent of the client such as a web browser.

At step 410, an security agent (e.g., security agent 135 described with respect to FIG. 1; also known as a single sign-on agent or policy-enforcement agent) of the access management system intercepts the request. The security agent may be deployed with the first resource as a plugin or as a portion of the first resource, or the security agent may be provisioned separate from the first resource, for example, running on a web server in front of the first resource. In some embodiments, the security agent is a webgate. The webgate may be a web-server plug-in for the access management system that intercepts HTTP requests and forwards them to the access manager server for authentication and authorization. At step 415, the security agent checks a resource pattern to determine whether the request is for a WEB resource access. In some embodiments, the security agent checks an access item provided in the HTTP header of the request. The access item may be either a single character (always matches) or may be multiple characters such as a domain with one or more wildcards (e.g., at the start and/or end) and optionally a scheme and specified port. The access item is compared to a predefined syntax (e.g., an extended Backus-Naur form) that may be stored in a protection policy of the security agent for the resource. Defining and storing the syntax for pattern recognition may be an administrative activity while seeding the protection policies in the access manager system. If the access item matches the predefined syntax for a WEB resource access, the process continues at step 420. If the access item does not match the predefined syntax for a WEB resource access, the process continues at step 455 to determine whether the access item matches the predefined syntax for an API resource access.

At step 420, the security agent initiates a login flow by redirecting the request to the access management server to determine an authentication scheme for the requested resource. In some embodiments, the security agent will query the access manager server to determine if the requested resource is protected. For example, the security agent may forward the request to the access manager server. The access manager server checks relevant authentication policies for the resource to determine the authentication scheme for the requested resource, for example, whether authentication is required for access to the resource, and if so how the authentication is performed. If the requested resource is protected and requires authentication for use, the access manager server may determine whether any session exists for the user by checking for the existence of a session cookie such as a SSO cookie. The access manager server may log and return the authentication scheme to the security agent.

At step 425, upon determining the authentication scheme, the security agent redirects the request for the WEB resource access to obtain and validate authentication credentials of the user. In various embodiments, determining the authentication scheme includes determining that the resource is protected. Upon determining that the resource is protected, the security agent may set a tracking cookie to keep track of the target or requested URL of the WEB resource, and then redirect the access management server, which routes the request to a login service (e.g., authentication service 155 as described with respect to FIG. 1) of the identity management system. In some embodiments, the agent of the client follows the redirect initiated by the access manager server and provides authentication credentials for authentication to the login service. For example, the authentication service may serve up a login page, which requests and captures the authentication credentials (e.g., user name/password, accept or decline a push notification, or the like) from the user.

At step 430, the authentication service authenticates the user upon receiving the proper authentication credentials. In some embodiments, the authentication service authenticates the user by validating the authentication credentials against those stored in a user directory or identity store. Once the authentication credentials are validated, the access manager server creates an authentication token, establishes a first session for the user (e.g., establishes a session in a web session management module), and sets a session cookie, which has details about the user, the time the session was created, the idle timeout, and a session identifier to the web session management module session. In some embodiments, the access manager server also creates a bearer token. The bearer token is a security token that grants the "bearer" access to the protected resource. In certain embodiments, the bearer token is a structured web token such as a JavaScript Object Notation (JSON) Web Token (JWT), which is a JSON-based open standard. The bearer token may be designed to be compact, URL-safe and usable especially in web browser SSO context. In various embodiments, the access token is a structured web token that asserts some number of claims. For example, the access manager server could issue a bearer token that has an expiration claim that denotes when the bearer token expires, a token issuer claim that denotes the issuer, a token audience that denotes the intended recipient of the bearer token, or any other type of claims as required by business processes. In certain embodiments, the bearer token includes a claim or a common identifier such that the bearer token is linked to the session. For example, the common identifier may be a session identifier. The common identifier allows for the bearer token to be used to pass identity of the authenticated user and session between the identity provider (e.g., the access management system) and a service provider (e.g., the enterprise system). In certain embodiments, the bearer token is signed with the access manager server's private key such that both parties are able to verify that the bearer token is legitimate. For example, the bearer token may be signed using the header and the payload of the bearer token, a shared secret established between the client agent such as the browser and access manager server during the agent provisioning handshake, and a hashing algorithm.

At step 435, the access manager server constructs a response to the request for the WEB resource access, and forwards the response to the security agent. The response includes the authentication token, the session cookie, and the bearer token. In some embodiments, one or more of the authentication token, the session cookie, and the bearer token are encrypted with the security agent's key.

At step 440, the security agent receives the response, extracts the authentication token and the session identifier, and uses that information to set an authentication cookie. In various embodiments, the authentication cookie may be set with the common identifier such that the authentication cookie and the bearer token are tied together. In some embodiments, the common identifier is the session identifier. In some embodiments, the security agent extracts the authentication token and the session identifier by decrypting the authentication token and the session identifier with the key. The authentication cookie may be a key-value data pair and may be stored in a location such as the user's browser (e.g., OAMAuthnCookie_<host:port>_<random number>). For authentication, the key may be, for example, 'username' and the value would be the username. Once the authentication cookie is set, the user is logged into the host server for the session. Once logged in, the user may access the WEB resource to which the user is authorized to access, such as running different applications, accessing cloud storage, or the like. Each time the user makes a request to the host server to access the WEB resource, the browser will include the authentication cookie in the request, and the access manager server will check for the existence of the authentication cookie.

At step 445, a user invokes (i.e., makes an API call) an endpoint of an API for access to a second resource (e.g., an API resource). In various embodiments, the API is a REST API, the call is being made with a predefined set of stateless operations to a REST endpoint, and the API resource is a REST API resource. The user may make the call using an agent of the client. In some embodiments, the agent is a standalone tool, application, command line, or a browser. In certain embodiments, the bearer token is included in the header of the call to the API. For example, instead of providing a scoped access token in the header of the call for authentication, the agent of the client makes the call using the bearer token issued in response to a request for access to a WEB resource. In certain embodiments, the user makes the call for the API resource access during the same session used to request the WEB resource access. As used herein, the session is the period of activity between the user logging in to the distributed environment and logging out of the distributed environment (or the session timing out). For example, the user is not initiating a separate log in process for the API resource access. Instead, the user is seamlessly transitioning from the WEB resource access over to the API resource access in a same session based on the previous authentication process for the WEB resource access. In certain embodiments, the session is a single-sign-on session (SSO).

At step 450, the security agent intercepts the call. The security agent may be deployed with the resource as a plugin or as a portion of the second resource, or the security agent may be provisioned separate from the second resource, for example, running on a web server in front of the end point or the second resource. In some embodiments, the security agent is a webgate. At step 455, the security agent checks a resource pattern to determine whether the call is for an API resource access. In some embodiments, the security agent checks an access item provided in the header of the API call. The access item may be either a single character (always matches) or may be multiple characters such as a URL domain with one or more wildcards (e.g., at the start and/or end) and optionally a scheme and specified port. The access item is compared to a predefined syntax (e.g., an extended Backus-Naur form) that may be stored in a protection policy of the security agent for the resource. Defining and storing the syntax for pattern recognition may be an administrative activity while seeding the protection policies in the access manager system. If the access item matches the predefined syntax for an API resource access, the process continues at step 460. If the access item does not match the predefined syntax for an API resource access, the process continues at step 415 to determine whether the access item matches the predefined syntax for a WEB resource access.

At step 460, the security agent initiates a token exchange flow by redirecting the call to the access management server to exchange the bearer token for an access token. In some embodiments, the security agent will redirect the call to an endpoint of the access management server (e.g., /authorize and /oauth/token). At the endpoint, the access management server will determine whether the bearer token is valid. In some embodiments, checking the validation of the bearer token includes one or more of checking whether the bearer token is well formed, checking the signature, verifying the signature, and validating the claims. In some embodiments, checking the validation of the bearer token includes parsing the bearer token to check whether the bearer token is well formed. In certain embodiments, a well formed bearer token, has at least three strings separated by dots (.): the header, the payload and the signature. At step 465, if verification fails, the bearer token is considered invalid and access management server will send an unauthorized status code so that webgate or client may initiate a fresh login flow. In some embodiments, checking the validation of the bearer token includes checking the signature. In some embodiments, checking the signature of the bearer token includes checking if the algorithm, as specified by the bearer header, matches the one expected by the access management server. To check if the signature matches the access management server's expectations, the access management server decodes the bearer token and retrieves the algorithm property of the bearer token header. In some embodiments, checking the validation of the bearer token includes verifying the signature. This is necessary to verify that the sender of the bearer token is who they says they are and to ensure that the message wasn't changed along the way. As discussed above, the signature was created using the header and the payload of the bearer token, a shared secret and a hashing algorithm. To verify a token's signature, the access management server can use one of the libraries available. At step 465, if the verification fails, the bearer token is considered invalid and the access management server will send an unauthorized status code (e.g., an invalid signature error) so that webgate or client may initiate a fresh login flow.

In some embodiments, checking the validation of the bearer token includes validating the claims of the bearer token. In some embodiments, checking the validation of the claims includes checking the token expiration, the issuer of the token, and the token audience or intended recipients of the bearer token. In order to validate the claims, the access management server can decode the bearer token and validate the values of the claims. In certain embodiments, checking the validation of the claims includes checking that the common identifier of the bearer token matches the common identifier of the session cookie. At step 465, if the verification fails, the bearer token is considered invalid and the access management server will send an unauthorized status code (e.g., a mismatched common identifier) so that webgate or client may initiate a fresh login flow.

At step 470, if the access token is valid, then the access management server will issue an access token and exchange the bearer token for the access token. The access token may be issued via the endpoint. In some embodiments, the access token is in a JWT format. In other embodiments, the access token is an opaque string. In some embodiments, the format (e.g., JWT versus opaque) of the access token is determined based on the audience of the access token. The access management server may issue the access token by using a library to obtain access tokens for the intended endpoint of the API call. In various embodiments, the access token is a JWT access token that asserts some number of claims. For example, the access manager server could issue a token that has an expiration claim that denotes when the access token expires, a token issuer claim that denotes the issuer, and a token audience that denotes the intended recipient of the access token. In some embodiments, the access token has a one or more scopes. Scopes provide a way to limit the amount of access that is granted to an access token. For example, an access token issued to a client agent may be granted READ and WRITE access to protected resources, or just READ access. A developer can implement their APIs to enforce any scope or combination of scopes they wish. So, if a client receives a token that has READ scope, and it tries to call an API endpoint that requires WRITE access, the call will fail.

At step 475, the security agent initiates API resource access by redirecting the call with the access token to the end point of the API call. The API will determine whether the bearer token is valid. In some embodiments, checking the validation of the access token includes one or more of checking whether the bearer token is well formed, checking the signature, verifying the signature, validating the claims, and checking the scope and permissions, as described in detail herein. In some embodiments, checking the validation of the bearer token includes verifying that the agent or user has the permissions required to access the protected resources. In some embodiments, checking the agent or user has permissions required includes checking the content of the scopes and the permissions required for the endpoint requested in the call. In order to validate the claims, the access management server can decode the bearer token and validate the values of the claims. For example, if a request requests access to a /create endpoint, but the scope claim does NOT include the value create:users, then the API should reject the request. If any of these checks fail, the access token is invalid and the request should be rejected. Once these checks have been performed successfully, the API can be assured that: the access token was issued by the access management server and the access token was issued to the user or agent operated by the user with the common identifier. The API can now process the request, allowing the agent or user to execute the predefined set of stateless operations (e.g., READ or WRITE) on the resource.

Transition from API Resource Access to WEB Resource Access

Figure 5:
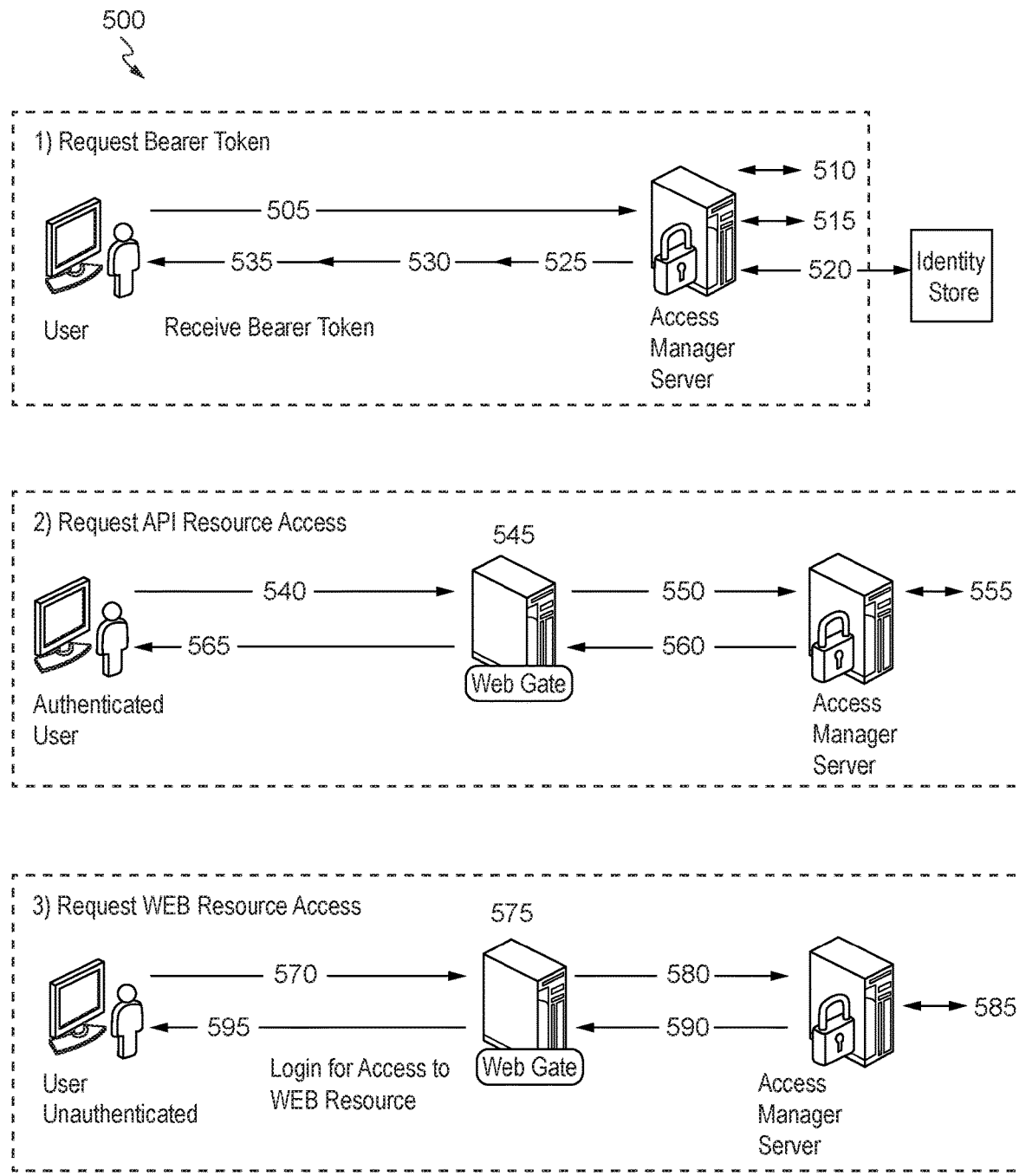
FIG. 5 illustrates an example of a transition from an API resource access to a WEB resource access within a distributed environment implementing an access management system comprising an agent component and an access manager server in accordance with various embodiments.

FIG. 5 illustrates an example session 500 of a transition from a API resource access to an WEB resource access within a distributed environment implementing an access management system comprising an agent component and an access manager server, as described with respect to FIG. 1. In various embodiments, at step 505 a user invokes (i.e., makes an API call) an authorization endpoint (e.g., /authorize and /oauth/token) of the access management server to obtain a bearer token. In various embodiments, the invoking the authorization endpoint initiates at step 510 a login flow by the access management server to determine an authentication scheme for the bearer token. Upon determining the authentication scheme, the access manager server obtains and validates authentication credentials of the user. In various embodiments, determining the authentication scheme includes determining that the bearer token is protected. Upon determining that the bearer token is protected, at step 515 the access management server routes the request to an authentication service of the identity management system. The authentication service may request authentication credentials (e.g., user name/password, accept or decline a push notification, or the like) from the user. For example, the authentication service may forward a login form to the client device based on the authentication policy to obtain the required authentication credentials from the user for the bearer token. The user may complete the log in form and send the credentials to the authentication service. The authentication service may authenticate the user upon receiving the proper authentication credentials by validating the credentials against those stored in a user directory or identity store, at step 520.

Based on receiving the proper authentication credentials for the user, at step 525, the access manager server may establish a bearer token. In various embodiments, the bearer token is a structured web token that asserts some number of claims. For example, the access manager server could issue a bearer token that has an expiration claim that denotes when the bearer token expires, a token issuer claim that denotes the issuer, a token audience that denotes the intended recipient of the bearer token, or any other type of claims as required by business processes. In certain embodiments, the bearer token includes a claim or a common identifier such that the bearer token is linked to the session. For example, the common identifier may be a session identifier. The common identifier allows for the bearer token to be used to pass identity of the authenticated user and session between the identity provider (e.g., the access management system) and a service provider (e.g., the enterprise system). At step 530, the access manager server logs success or failure of credential validation. If the authentication process is a success, then at step 535 the authentication service may forward a response with the bearer token to the agent of the client. If the authentication process is a failure, then the security agent notifies the client that the authorization failed (e.g., the user may be redirected to another URL determined by an administrator).

In various embodiments, at step 540 a user invokes (i.e., makes an API call) an endpoint of an API for access to a first resource (e.g., an API resource). In certain embodiments, the bearer token is included in the header of the API call. The call may be routed to or intercepted by a security agent (e.g., a webgate), which controls access to the resource. In some embodiments, at step 543 the security agent checks a resource pattern to determine whether the request is for an API resource access. If the access request is for an API resource access, the process continues at step 545 where the security agent initiates a token exchange process. If the access request is not for an API resource access, the process continues at step 575 to determine whether the access request is for a WEB resource access. At step 550, the security agent initiates a token exchange process by redirecting the call to the access management server to exchange the bearer token for an access token. In some embodiments, the security agent will redirect the call to an endpoint of the access management server (e.g., /authorize and /oauth/token). At the endpoint, the access management server will determine whether the bearer token is valid, at step 555. If verification fails, the bearer token is considered invalid and access management server will send an unauthorized status code so that webgate or client may initiate a fresh login flow. At step 560, if the bearer token is valid, then the access management server will issue an access token and exchange the bearer token for the access token. The access token may be issued via the endpoint. The access token is a different token from the bearer token and does not include the common identifier. At step 565, the security agent initiates API resource access by redirecting the call with the access token to the end point of the API call. As should be understood, providing access to the WEB resource and providing access to the API resource occurs in the same session identified by the common identifier.

In various embodiments, at step 570 a user may operate client device to request access (e.g., via a WEB URL) to a second resource controlled by a distributed environment server. In certain embodiments, the operation of the client for the request includes the client passing the bearer token to an agent being used to make the request for access to the second resource. The request may be routed to or intercepted by a security agent (e.g., a webgate), which controls access to the resource. In some embodiments, at step 575 the security agent checks a resource pattern to determine whether the request is for a WEB resource access. If the access request is for a WEB resource access, the process continues at step 580 where the security agent initiates a login flow by redirecting the request with the bearer token in the header to the access management server to determine an authentication scheme for the requested resource. For example, the security agent may forward the request to the access manager server. If the access request is not for a WEB resource access, the process continues at step 545 to determine whether the access request is for an API resource access.

At step 585, the access manager server checks relevant authentication policies for the resource to determine the authentication scheme for the requested resource, for example, whether authentication is required for access to the resource. Upon determining, that the resource is unprotected, the resource is served by the security agent to the user (e.g., the security agent grants access for the client device to the resource on a host server). Upon determining that the resource is protected, the access manager server will determine whether the bearer token is valid. In some embodiments, checking the validation of the bearer token includes one or more of checking whether the bearer token is well formed, checking the signature, verifying the signature, and validating the claims. If the bearer token is valid, then the access management server will create a session for access to the WEB resource using the information stored in the bearer token. At step 590, the access manager server constructs a response to the request for the WEB resource access, and forwards the response to the security agent. The response includes the authentication token, the session cookie, and the bearer token. The security agent may check the authentication and create an authentication cookie using the authentication token, and as a result, the user is logged into the distributed environment server for the session. The authentication cookie is established with the common identifier such that the authentication cookie and the bearer token are tied together. Once logged in, the user may access resources to which the user is authorized to access at step 595 (authorization may be processed as discussed with respect to FIGS. 1 and 2), such as running different applications, accessing cloud storage, or the like. If the authentication process is a failure, then the security agent notifies the client that the authorization failed (e.g., the user may be redirected to another URL determined by an administrator).

Figure 6:
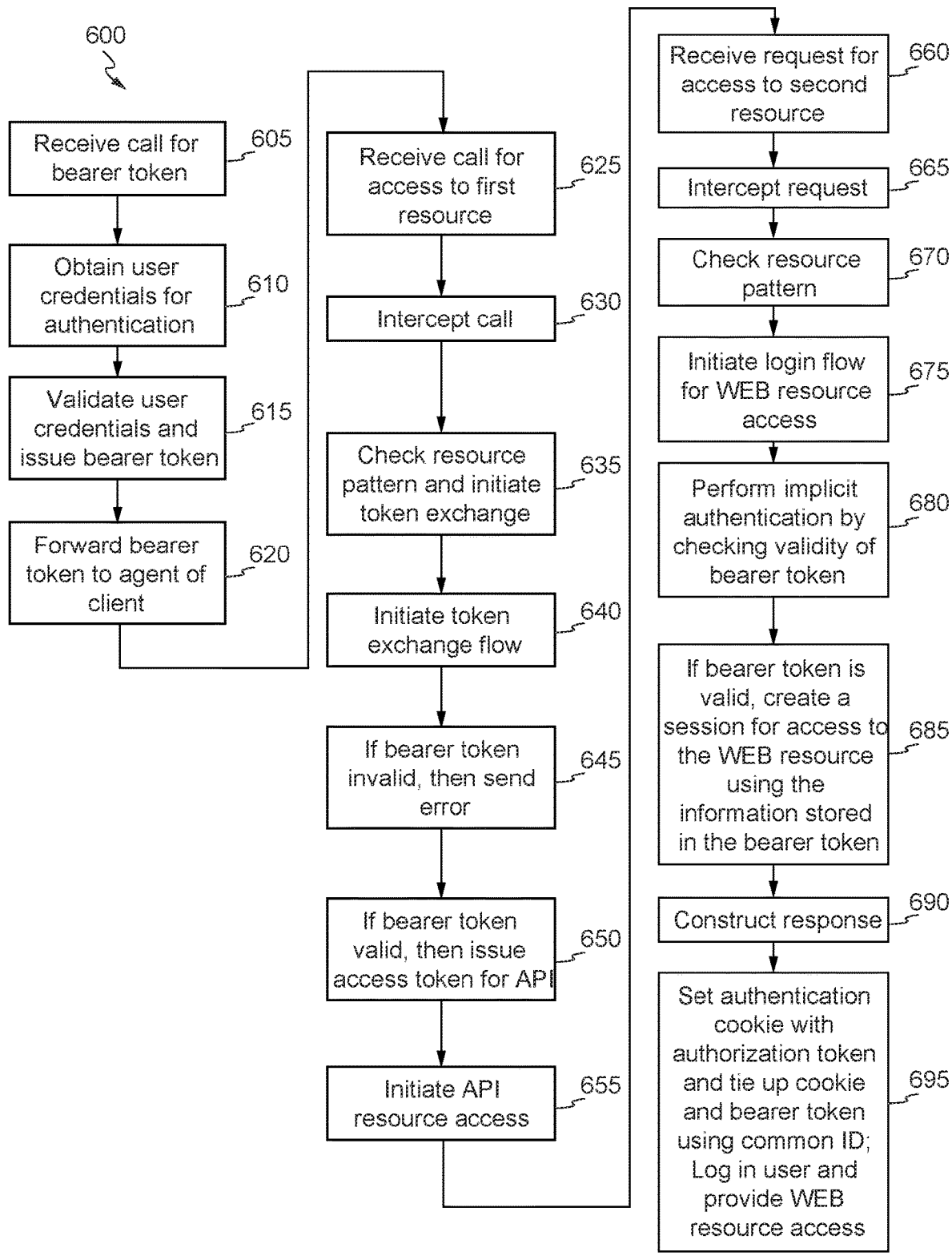
FIG. 6 depicts a flowchart illustrating a process for transitioning from API resource access to WEB resource access in accordance with various embodiments.

FIG. 6 illustrates a process and operation for accessing a WEB resource and subsequently accessing an API resource from a same access session (e.g., a SSO session) according to various embodiments. Individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes and/or operations depicted by in FIG. 6 may be implemented in software (e.g., code, instructions, program) executed by one or more processing units (e.g., processors cores), hardware, or combinations thereof. The software may be stored in a memory (e.g., on a memory device, on a non-transitory computer-readable storage medium). The particular series of processing steps in FIG. 6 is not intended to be limiting. Other sequences of steps may also be performed according to alternative embodiments. For example, in alternative embodiments the steps outlined above may be performed in a different order. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 6 shows a flowchart 600 that illustrates a process for accessing a API resource and subsequently accessing an WEB resource from a same access session (e.g., a SSO session) according to various embodiments. In some embodiments, the processes depicted in flowchart 600 may be implemented by the system of FIGS. 1, 2, and 5. At step 605, a user invokes (i.e., makes an API call) an authorization endpoint (e.g., /authorize and /oauth/token) of the access management server to obtain a bearer token. In various embodiments, the invoking the authorization endpoint initiates a login flow by the access management server to determine an authentication scheme for the bearer token. The access manager server checks relevant authentication policies for the bearer token to determine the authentication scheme for the bearer token, for example, whether authentication is required for the bearer token, and if so how the authentication is performed. If the bearer token is protected and requires authentication for use, the access manager server may determine whether any session exists for the user by checking for the existence of a session cookie such as a SSO cookie. The access manager server may log and return the authentication scheme to the security agent.

At step 610, upon determining the authentication scheme, the access manager server obtains and validates authentication credentials of the user. In various embodiments, determining the authentication scheme includes determining that the bearer token is protected. Upon determining that the bearer token is protected, the access management server routes the request to a login service (e.g., authentication service 155 as described with respect to FIG. 1) of the identity management system. In some embodiments, the agent of the client provides authentication credentials for authentication to the login service. For example, the authentication service may serve up a login page, which requests and captures the authentication credentials (e.g., user name/password, accept or decline a push notification, or the like) from the user. In some embodiments, the agent is a stand-alone tool, application, command line, or a browser.

At step 615, the authentication service authenticates the user upon receiving the proper authentication credentials. In some embodiments, the authentication service authenticates the user by validating the authentication credentials against those stored in a user directory or identity store. Once the authentication credentials are validated, the access manager server creates a bearer token. The bearer token is a security token that grants the "bearer" access to the protected resource. In certain embodiments, the bearer token is a structured web token such as a JavaScript Object Notation (JSON) Web Token (JWT), which is a JSON-based open standard. The bearer token may be designed to be compact, URL-safe and usable especially in web browser SSO context. In various embodiments, the bearer token is a structured web token that asserts some number of claims. For example, the access manager server could issue a bearer token that has an expiration claim that denotes when the bearer token expires, a token issuer claim that denotes the issuer, a token audience that denotes the intended recipient of the bearer token, or any other type of claims as required by business processes. In certain embodiments, the bearer token includes a claim or a common identifier such that the bearer token is linked to the session. For example, the common identifier may be a session identifier. The common identifier allows for the bearer token to be used to pass identity of the authenticated user and session between the identity provider (e.g., the access management system) and a service provider (e.g., the enterprise system). In certain embodiments, the bearer token is signed with the access manager server's private key such that both parties are able to verify that the bearer token is legitimate. For example, the bearer token may be signed using the header and the payload of the bearer token, a shared secret established between the client agent such as the browser and access manager server during the agent provisioning handshake, and a hashing algorithm.

At step 620, the access manager server constructs a response to the request for the bearer token, and forwards the response to the agent of the client. The response includes the bearer token. At step 625, a user invokes (i.e., makes an API call) an endpoint of an API for access to a first resource (e.g., an API resource). In various embodiments, the API is a REST API, the call is being made with a predefined set of stateless operations to a REST endpoint (e.g., e.g., GET all audit reports for logged-in user), and the API resource is a REST API resource. The user may make the call using the agent of the client. In certain embodiments, the bearer token is included in the header of the call to the API. For example, instead of providing a scoped access token in the header of the call for authentication, the agent of the client makes the call using the bearer token issued by the access manager server in step 615.

At step 630, the security agent intercepts the call. The security agent may be deployed with the resource as a plugin or as a portion of the second resource, or the security agent may be provisioned separate from the second resource, for example, running on a web server in front of the end point or the second resource. In some embodiments, the security agent is a webgate. At step 635, the security agent checks a resource pattern to determine whether the call is for an API resource access. In some embodiments, the security agent checks an access item provided in the header of the API call. The access item may be either a single character (always matches) or may be multiple characters such as a URL domain with one or more wildcards (e.g., at the start and/or end) and optionally a scheme and specified port. The access item is compared to a predefined syntax (e.g., an extended Backus-Naur form) that may be stored in a protection policy of the security agent for the resource. Defining and storing the syntax for pattern recognition may be an administrative activity while seeding the protection policies in the access manager system. If the access item matches the predefined syntax for an API resource access, the process continues at step 640. If the access item does not match the predefined syntax for an API resource access, the process continues at step 670 to determine whether the access item matches the predefined syntax for a WEB resource access.

At step 640, the security agent initiates a token exchange flow by redirecting the call to the access management server to exchange the bearer token for an access token. In some embodiments, the security agent will redirect the call to an endpoint of the access management server (e.g., /authorize and /oauth/token). At the endpoint, the access management server will determine whether the bearer token is valid. In some embodiments, checking the validation of the bearer token includes one or more of checking whether the bearer token is well formed, checking the signature, verifying the signature, and validating the claims, as discussed in detail herein with respect to FIG. 4. At step 645, if verification fails, the bearer token is considered invalid and access management server will send an unauthorized status code so that webgate or client may initiate a fresh login flow.

At step 650, if the bearer token is valid, then the access management server will issue an access token and exchange the bearer token for the access token. The access token may be issued via the endpoint. In some embodiments, the access token is in a JWT format. In other embodiments, the access token is an opaque string. In some embodiments, the format (e.g., JWT versus opaque) of the access token is determined based on the audience of the access token. The access management server may issue the access token by using a library to obtain access tokens for the intended endpoint of the API call. In various embodiments, the access token is a JWT access token that asserts some number of claims. For example, the access manager server could issue a token that has an expiration claim that denotes when the access token expires, a token issuer claim that denotes the issuer, and a token audience that denotes the intended recipient of the access token. In some embodiments, the access token has a one or more scopes. Scopes provide a way to limit the amount of access that is granted to an access token. For example, an access token issued to a client agent may be granted READ and WRITE access to protected resources, or just READ access. A developer can implement their APIs to enforce any scope or combination of scopes they wish. So, if a client receives a token that has READ scope, and it tries to call an API endpoint that requires WRITE access, the call will fail.

At step 655, the security agent initiates API resource access by redirecting the call with the access token to the end point of the API call. The API will determine whether the bearer token is valid. In some embodiments, checking the validation of the access token includes one or more of checking whether the bearer token is well formed, checking the signature, verifying the signature, validating the claims, and checking the scope and permissions, as described in detail herein with respect to FIG. 4. If any of these checks fail, the access token is invalid and the request may be rejected. Once these checks have been performed successfully, the API can be assured that: the access token was issued by the access management server and the access token was issued to the user or the agent operated by the user with the common identifier. The API can now process the request, allowing the agent or user to execute the predefined set of stateless operations (e.g., READ or WRITE) on the resource.

At step 660, the client pass the bearer token to an agent and a user makes a request to access a second resource. In various embodiments, upon the user initiating a process to request access to the second resource, the bearer token is passed from the agent used to request the API resource access (e.g., a standalone tool, application, command line, or a browser) to the agent used to request access to the second resource (e.g., a browser). In the instance that the agent is the same for both requests, then the bearer token is simply used in the request and the passing process is not initiated. The process to request the access may include a user operating a client device (e.g., client device 105 discussed with respect to FIG. 1) to access a network such as an enterprise computer network that includes a distributed computing system. In some embodiments, the distributed computing system may include a distributed environment server (e.g., a cloud server) that delivers content, computing power, and/or storage capacity as a service to the user via a network. The second resource (e.g., application and data) may be stored on the distributed environment server in an instance that is accessible by the client device via the network. In some embodiments, the second resource is a WEB resource. Some examples of a WEB resource are web pages, e-mail, information from databases, and web services. A URL may be used to identify the second resource on a web page or website (collection of web pages) held by a host server (e.g., the distributed environment server) on the WEB. The web page or website may be accessed via the URL by the user making a HTTP request to access the second resource on the web server using the agent of the client such as the web browser. In certain embodiments, the bearer token is included in the header of the HTTP request to access the second resource on the web server using the agent of the client.

At step 665, a security agent (e.g., security agent 135 described with respect to FIG. 1) of the access management system intercepts the request. The security agent may be deployed with the second resource as a plugin or as a portion of the second resource, or the security agent may be provisioned separate from the second resource, for example, running on a web server in front of the second resource. In some embodiments, the security agent is a webgate. The webgate may be a web-server plug-in for the access management system that intercepts HTTP requests and forwards them to the access manager server for authentication and authorization. At step 670, the security agent checks a resource pattern to determine whether the request is for a WEB resource access. In some embodiments, the security agent checks an access item provided in the HTTP header of the request. The access item may be either a single character (always matches) or may be multiple characters such as a domain with one or more wildcards (e.g., at the start and/or end) and optionally a scheme and specified port. The access item is compared to a predefined syntax (e.g., an extended Backus-Naur form) that may be stored in a protection policy of the security agent for the resource. Defining and storing the syntax for pattern recognition may be an administrative activity while seeding the protection policies in the access manager system. If the access item matches the predefined syntax for a WEB resource access, the process continues at step 675. If the access item does not match the predefined syntax for a WEB resource access, the process continues at step 635 to determine whether the access item matches the predefined syntax for an API resource access.

At step 675, the security agent initiates a login flow by redirecting the request with the bearer token in the header to the access management server to determine an authentication scheme for the requested resource. In various embodiments, the security agent will query the access manager server to determine if the requested resource is protected. For example, the security agent may forward the request to the access manager server. The access manager server checks relevant authentication policies for the resource to determine the authentication scheme for the requested resource, for example, whether authentication is required for access to the resource, and if so how the authentication is performed. If the requested resource is protected and requires authentication for use, the access manager server may determine whether any session exists for the user by checking for the existence of a session cookie such as a SSO cookie. The access manager server may log and return the authentication scheme to the security agent.

At step 680, upon determining the authentication scheme, the access manager server performs an implicit authentication of the user by checking the validation of the bearer token. In various embodiments, determining the authentication scheme includes determining that the resource is protected. Upon determining that the resource is protected, the access manager server will determine whether the bearer token is valid. In some embodiments, checking the validation of the bearer token includes one or more of checking whether the bearer token is well formed, checking the signature, verifying the signature, and validating the claims, as discussed in detail herein with respect to FIG. 4. At step 680, if verification fails, the bearer token is considered invalid and access management server will send an unauthorized status code so that webgate or client may initiate a fresh login flow.

At step 685, if the bearer token is valid, then the access management server will create a session for access to the WEB resource using the information stored in the bearer token. In various embodiments, once the bearer token is validated, the access manager server creates an authentication token, establishes a session for the user (e.g., establishes a session in a web session management module), and sets a session cookie, which has details about the user, the time the session was created, the idle timeout, and a session identifier to the web session management module session. In some embodiments, the access manager server creates the session using the information stored in the bearer token such that the transition between the API resource access request and the WEB resource access request is seamless. In certain embodiments, the information used to create the session includes the common identifier. The common identifier allows for the bearer token to be used to pass identity of the authenticated user and session between the identity provider (e.g., the access management system) and a service provider (e.g., the enterprise system).

At step 690, the access manager server constructs a response to the request for the WEB resource access, and forwards the response to the security agent. The response includes the authentication token, the session cookie, and the bearer token. In some embodiments, one or more of the authentication token, the session cookie, and the bearer token are encrypted with the security agent's key.

At step 695, the security agent receives the response, extracts the authentication token and the session identifier, and uses that information to set an authentication cookie. In various embodiments, the authentication cookie may be set with the common identifier such that the authentication cookie and the bearer token are tied together. In some embodiments, the common identifier is the session identifier. In some embodiments, the security agent extracts the authentication token and the session identifier by decrypting the authentication token and the session identifier with the key. The authentication cookie may be a key-value data pair and may be stored in a location such as the user's browser (e.g., OAMAuthnCookie_<host:port>_<random number>). For authentication, the key may be, for example, 'username' and the value would be the username. Once the authentication cookie is set, the user is logged into the host server for the session. Once logged in, the user may access the WEB resource to which the user is authorized to access, such as running different applications, accessing cloud storage, or the like. Each time the user makes a request to the host server to access the WEB resource, the browser will include the authentication cookie in the request, and the access manager server will check for the existence of the authentication cookie.

Illustrative Systems

Figure 7:
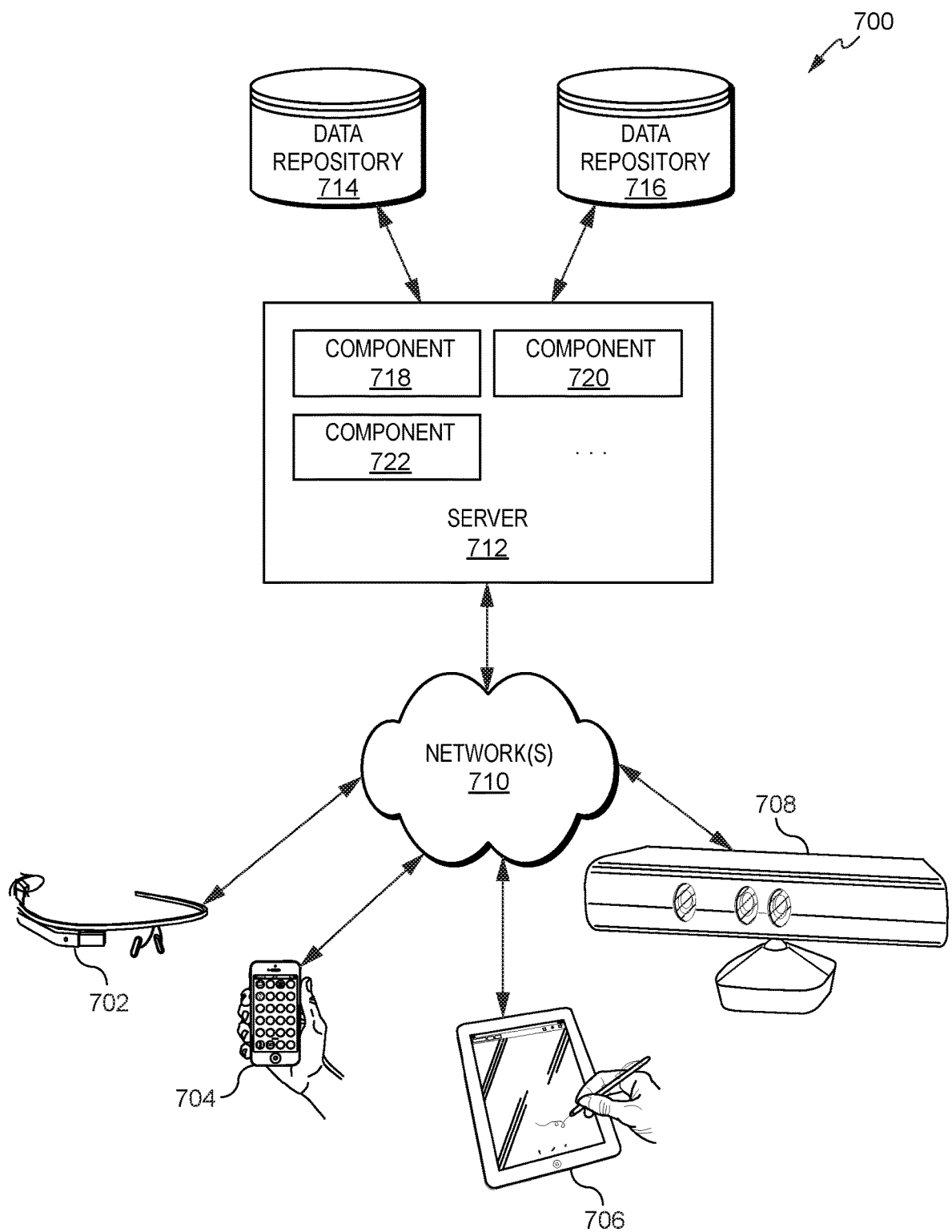
FIG. 7 illustrates a simplified diagram of a distributed system for implementing various embodiments.

FIG. 7 depicts a simplified diagram of a distributed system 700 for implementing an embodiment. In the illustrated embodiment, distributed system 700 includes one or more client computing devices 702, 704, 706, and 708, coupled to a server 712 via one or more communication networks 710. Clients computing devices 702, 704, 706, and 708 may be configured to execute one or more applications.

In various embodiments, server 712 may be adapted to run one or more services or software applications that enable seamless transitioning between WEB access to API access and vice versa.

In certain embodiments, server 712 may also provide other services or software applications that can include non-virtual and virtual environments. In some embodiments, these services may be offered as web-based or cloud services, such as under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in FIG. 7, server 712 may include one or more components 718, 720 and 722 that implement the functions performed by server 712. These components may include software components that may be executed by one or more processors, hardware components, or combinations thereof. It should be appreciated that various different system configurations are possible, which may be different from distributed system 700. The embodiment shown in FIG. 7 is thus one example of a distributed system for implementing an embodiment system and is not intended to be limiting.

Users may use client computing devices 702, 704, 706, and/or 708 to request access to resources, provide credentials for authentication/authorization, and utilize resources in accordance with the teachings of this disclosure. A client device may provide an interface that enables a user of the client device to interact with the client device. The client device may also output information to the user via this interface. Although FIG. 7 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 710 may be any type of network familiar to those skilled in the art that can support data communications using any of a variety of available protocols, including without limitation TCP/IP (transmission control protocol/ Internet protocol), SNA (systems network architecture), IPX (Internet packet exchange), AppleTalk®, and the like. Merely by way of example, network(s) 710 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 712 can include one or more virtual machines running virtual operating systems, or other computing architectures involving virtualization such as one or more flexible pools of logical storage devices that can be virtualized to maintain virtual storage devices for the server. In various embodiments, server 712 may be adapted to run one or more services or software applications that provide the functionality described in the foregoing disclosure.

The computing systems in server 712 may run one or more operating systems including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more data repositories 714, 716. These data repositories may be used to store data and other information in certain embodiments. For example, one or more of the data repositories 714, 716 may be used to store information such as authentication and authorization policies, cookies, tokens, user information, profile data, etc. Data repositories 714, 716 may reside in a variety of locations. For example, a data repository used by server 712 may be local to server 712 or may be remote from server 712 and in communication with server 712 via a network-based or dedicated connection. Data repositories 714, 716 may be of different types. In certain embodiments, a data repository used by server 712 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 714, 716 may also be used by applications to store application data. The data repositories used by applications may be of different types such as, for example, a key-value store repository, an object store repository, or a general storage repository supported by a file system.

Figure 8:
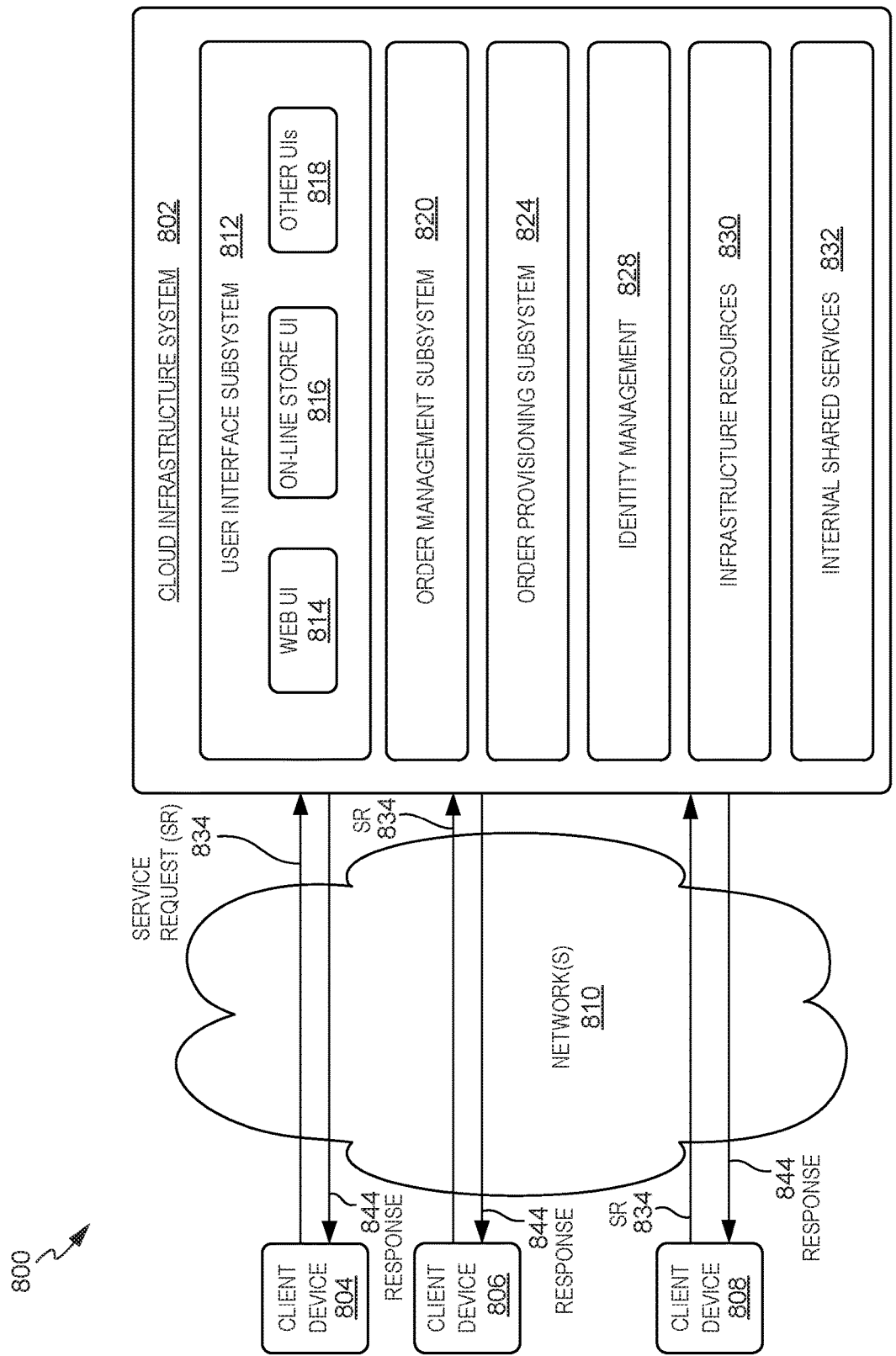
FIG. 8 illustrates a simplified block diagram of one or more elements of a system environment in which services may be offered as cloud services in accordance with various embodiments.

In certain embodiments, the access control functionalities described in this disclosure may be offered as services via a cloud environment. FIG. 8 is a simplified block diagram of a cloud-based system environment in which various access control services may be offered as cloud services, in accordance with certain embodiments. In the embodiment depicted in FIG. 8, cloud infrastructure system 802 may provide one or more cloud services that may be requested by users using one or more client computing devices 804, 806, and 808. Cloud infrastructure system 802 may comprise one or more computers and/or servers that may include those described above for server 712. The computers in cloud infrastructure system 802 may be organized as general purpose computers, specialized server computers, server farms, server clusters, or any other appropriate arrangement and/or combination.

Network(s) 810 may facilitate communication and exchange of data between clients 804, 806, and 808 and cloud infrastructure system 802. Network(s) 810 may include one or more networks. The networks may be of the same or different types. Network(s) 810 may support one or more communication protocols, including wired and/or wireless protocols, for facilitating the communications.

The embodiment depicted in FIG. 8 is only one example of a cloud infrastructure system and is not intended to be limiting. It should be appreciated that, in some other embodiments, cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in alternative embodiments.

The term cloud service is generally used to refer to a service that is made available to users on demand and via a communication network such as the Internet by systems (e.g., cloud infrastructure system 802) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 802 may provide one or more cloud services using different models such as under a Software as a Service (SaaS) model, a Platform as a Service (PaaS) model, an Infrastructure as a Service (IaaS) model, and others, including hybrid service models. Cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 802. Cloud infrastructure system 802 then performs processing to provide the services requested in the customer's subscription order. For example, establishing bearer tokens, exchanging tokens, establishing authentication sessions, establishing access tokens, etc. Cloud infrastructure system 802 may be configured to provide one or even multiple cloud services.

Cloud infrastructure system 802 may provide the cloud services via different deployment models. In a public cloud model, cloud infrastructure system 802 may be owned by a third party cloud services provider and the cloud services are offered to any general public customer, where the customer can be an individual or an enterprise. In certain other embodiments, under a private cloud model, cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

Client computing devices 804, 806, and 808 may be of different types (such as devices 702, 704, 706, and 708 depicted in FIG. 7) and may be capable of operating one or more client applications. A user may use a client device to interact with cloud infrastructure system 802, such as to request a service provided by cloud infrastructure system 802. For example, a user may use a client device to request a resource access service described in this disclosure.

In some embodiments, the processing performed by cloud infrastructure system 802 for providing resource access services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 802 for providing access control. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are utilized for facilitating the provision of various cloud services offered by cloud infrastructure system 802. Infrastructure resources 830 may include, for example, processing resources, storage or memory resources, networking resources, and the like.

In certain embodiments, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 802 may itself internally use services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 802 may comprise multiple subsystems. These subsystems may be implemented in software, or hardware, or combinations thereof. As depicted in FIG. 8, the subsystems may include a user interface subsystem 812 that enables users or customers of cloud infrastructure system 802 to interact with cloud infrastructure system 802. User interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, and 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to. For example, a customer may place a subscription order for a resource access related service offered by cloud infrastructure system 802. As part of the order, the customer may provide information or credentials identifying the customer for authentication and authorization.

In certain embodiments, such as the embodiment depicted in FIG. 8, cloud infrastructure system 802 may comprise an order management subsystem (OMS) 820 that is configured to process the new order. As part of this processing, OMS 820 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 802 may send a response or notification 844 to the requesting customer to indicate when the requested service is now ready for use. In some instances, information (e.g., a link) may be sent to the customer that enables the customer to start using and availing the benefits of the requested services. In certain embodiments, for a customer requesting the resource access service, the response may include a authentication cookie, a bearer token, or an access token for accessing one or more resources (e.g., a WEB resource or an API resource).

Cloud infrastructure system 802 may provide services to multiple customers. For each customer, cloud infrastructure system 802 is responsible for managing information related to one or more subscription orders received from the customer, maintaining customer data related to the orders, and providing the requested services to the customer. Cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 802 may provide services to multiple customers in parallel. Cloud infrastructure system 802 may store information for these customers, including possibly proprietary information. In certain embodiments, cloud infrastructure system 802 comprises an identity management subsystem (IMS) 828 that is configured to manage customers information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
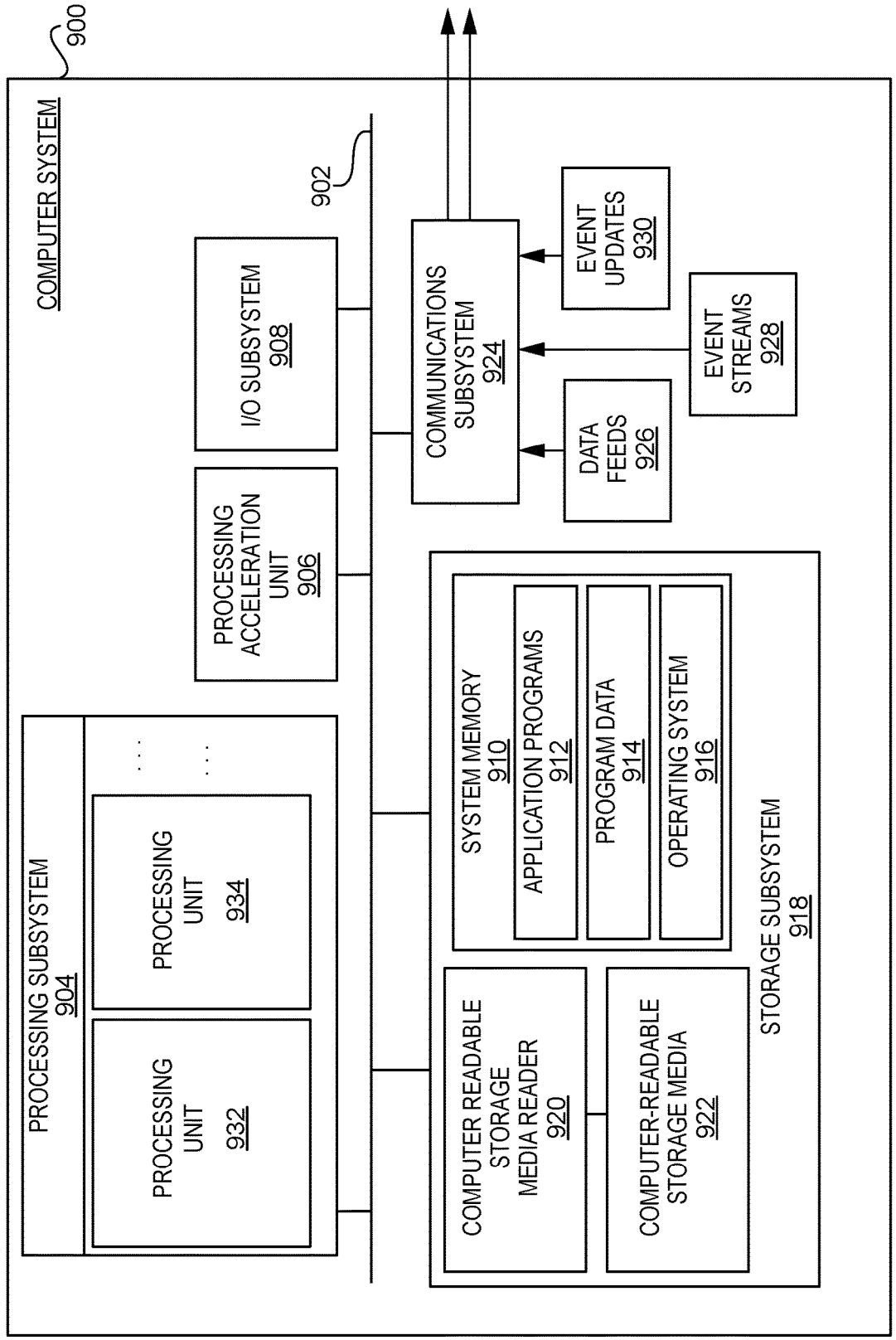
FIG. 9 illustrates an exemplary computer system that may be used to implement certain elements according to various embodiments.

FIG. 9 illustrates an exemplary computer system 900 that may be used to implement certain embodiments. For example, in some embodiments, computer system 900 may be used to implement any of the systems described with respect to FIGS. 1, 2, 3, and 5, and various servers and computer systems described above. As shown in FIG. 9, computer system 900 includes various subsystems including a processing subsystem 904 that communicates with a number of other subsystems via a bus subsystem 902. These other subsystems may include a processing acceleration unit 906, an I/O subsystem 908, a storage subsystem 918, and a communications subsystem 924. Storage subsystem 918 may include non-transitory computer-readable storage media including storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 904 controls the operation of computer system 900 and may comprise one or more processors, application specific integrated circuits (ASICs), or field programmable gate arrays (FPGAs). The processors may include be single core or multicore processors. The processing resources of computer system 900 can be organized into one or more processing units 932, 934, etc. A processing unit may include one or more processors, one or more cores from the same or different processors, a combination of cores and processors, or other combinations of cores and processors. In some embodiments, processing subsystem 904 can include one or more special purpose co-processors such as graphics processors, digital signal processors (DSPs), or the like. In some embodiments, some or all of the processing units of processing subsystem 904 can be implemented using customized circuits, such as application specific integrated circuits (ASICs), or field programmable gate arrays (FPGAs).

In some embodiments, the processing units in processing subsystem 904 can execute instructions stored in system memory 910 or on computer readable storage media 922. In various embodiments, the processing units can execute a variety of programs or code instructions and can maintain multiple concurrently executing programs or processes. At any given time, some or all of the program code to be executed can be resident in system memory 910 and/or on computer-readable storage media 922 including potentially on one or more storage devices. Through suitable programming, processing subsystem 904 can provide various functionalities described above. In instances where computer system 900 is executing one or more virtual machines, one or more processing units may be allocated to each virtual machine.

In certain embodiments, a processing acceleration unit 906 may optionally be provided for performing customized processing or for off-loading some of the processing performed by processing subsystem 904 so as to accelerate the overall processing performed by computer system 900.

I/O subsystem 908 may include devices and mechanisms for inputting information to computer system 900 and/or for outputting information from or via computer system 900. In general, use of the term input device is intended to include all possible types of devices and mechanisms for inputting information to computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google) Glass®. Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 918 provides a repository or data store for storing information and data that is used by computer system 900. Storage subsystem 918 provides a tangible non-transitory computer-readable storage medium for storing the basic programming and data constructs that provide the functionality of some embodiments. Storage subsystem 918 may store software (e.g., programs, code modules, instructions) that when executed by processing subsystem 904 provides the functionality described above. The software may be executed by one or more processing units of processing subsystem 904. Storage subsystem 918 may also provide a repository for storing data used in accordance with the teachings of this disclosure.

Storage subsystem 918 may include one or more non-transitory memory devices, including volatile and non-volatile memory devices. As shown in FIG. 9, storage subsystem 918 includes a system memory 910 and a computer-readable storage media 922. System memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 900, such as during start-up, may typically be stored in the ROM. The RAM typically contains data and/or program modules that are presently being operated and executed by processing subsystem 904. In some implementations, system memory 910 may include multiple different types of memory, such as static random access memory (SRAM), dynamic random access memory (DRAM), and the like.

By way of example, and not limitation, as depicted in FIG. 9, system memory 910 may load application programs 912 that are being executed, which may include various applications such as Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 922 may store programming and data constructs that provide the functionality of some embodiments. Computer-readable media 922 may provide storage of computer-readable instructions, data structures, program modules, and other data for computer system 900. Software (programs, code modules, instructions) that, when executed by processing subsystem 904 provides the functionality described above, may be stored in storage subsystem 918. By way of example, computer-readable storage media 922 may include non-volatile memory such as a hard disk drive, a magnetic disk drive, an optical disk drive such as a CD ROM, DVD, a Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 918 may also include a computer-readable storage media reader 920 that can further be connected to computer-readable storage media 922. Reader 920 may receive and be configured to read data from a memory device such as a disk, a flash drive, etc.

In certain embodiments, computer system 900 may support virtualization technologies, including but not limited to virtualization of processing and memory resources. For example, computer system 900 may provide support for executing one or more virtual machines. In certain embodiments, computer system 900 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 900. Accordingly, multiple operating systems may potentially be run concurrently by computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to establish a communication channel to one or more client devices via the Internet for receiving and sending information from and to the client devices. For example, the communication subsystem may be used to receive requests for access to resources and provide access to the resources.

Communication subsystem 924 may support both wired and/or wireless communication protocols. For example, in certain embodiments, communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

Communication subsystem 924 can receive and transmit data in various forms. For example, in some embodiments, in addition to other forms, communications subsystem 924 may receive input communications in the form of structured and/or unstructured data feeds 926, event streams 928, event updates 930, and the like. For example, communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 924 may be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to communicate data from computer system 900 to other computer systems or networks. The data may be communicated in various different forms such as structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, at a computing system, a request for access to a first resource;
   determining, by the computing system, the first resource is a world wide web (WEB) resource based on a first resource pattern;
   validating, by the computing system, credentials of a user for access to the WEB resource, wherein the credentials are validated based on an authentication scheme associated with the WEB resource;
   upon validation of the credentials:
      creating, by the computing system, an authentication cookie and a bearer token, wherein the authentication cookie and the bearer token are tied together using a session identifier; and
      creating, by the computing system, a session with the session identifier;
   providing, by the computing system, access to the WEB resource based on the authentication cookie;
   receiving, at the computing system, a call for access to a second resource, wherein the call includes the bearer token in a header of the call;
   determining, by the computing system, the second resource is an application programming interface (API) resource based on a second resource pattern;
   validating, by the computer system, the bearer token, wherein the bearer token is validated based on the session identifier in the bearer token matching the session identifier of the authentication cookie;
   upon validation of the bearer token initiating, by the computing system, a token exchange of the bearer token for an access token; and
   providing, by the computing system, access to the API resource based on the access token, wherein the providing access to the WEB resource and the providing access to the API resource occur in the same session identified by the session identifier.

2. The method of claim 1, further comprising determining, by the computing system, that the user is authorized to access the WEB resource.

3. The method of claim 2, wherein the access token is a different token from the bearer token and does not include the session identifier.

4. A non-transitory computer-readable memory storing a plurality of instructions executable by one or more processors, the plurality of instructions comprising instructions that when executed by the one or more processors cause the one or more processors to perform processing comprising:
   receiving a request for access to a first resource;
   determining the first resource is a world wide web (WEB) resource based on a first resource pattern;
   validating credentials of a user for access to the WEB resource, wherein the credentials are validated based on an authentication scheme associated with the WEB resource;
   upon validation of the credentials:
      creating an authentication cookie and a bearer token, wherein the authentication cookie and the bearer token are tied together using a session identifier; and
      creating a session with the session identifier;
   providing access to the WEB resource based on the authentication cookie;
   receiving a call for access to a second resource, wherein the call includes the bearer token in a header of the call;
   determining the second resource is an application programming interface (API) resource based on a second resource pattern;
   validating the bearer token, wherein the bearer token is validated based on the session identifier in the bearer token matching the session identifier of the authentication cookie;
   upon validation of the bearer token initiating a token exchange of the bearer token for an access token; and
   providing access to the API resource based on the access token, wherein the providing access to the WEB resource and the providing access to the API resource occur in the same session identified by the session identifier.

5. The non-transitory computer-readable memory of claim 4, wherein the processing further comprises determining, that the user is authorized to access the WEB resource.

6. The non-transitory computer-readable memory of claim 5, wherein the access token is a different token from the bearer token and does not include the session identifier.

7. A method comprising:
receiving, at a computing system, a first call for a bearer token;
validating, by the computing system, credentials of a user for access to the bearer token, wherein the credentials are validated based on an authentication scheme associated with the bearer token;
upon validation of the credentials;
creating, by the computing system, a bearer token, wherein the bearer token includes a session identifier; and
creating, by the computing system, a session with the session identifier;
receiving, at the computing system, a second call for access to a first resource, wherein the second call includes the bearer token in a header of the call;
determining, by the computing system, the first resource is an application programming interface (API) resource based on a first resource pattern;
validating, by the computer system, the bearer token, wherein the bearer token is validated based on the session identifier in the bearer token;
upon validation of the bearer token initiating, by the computing system, a token exchange of the bearer token for an access token;
providing, by the computing system, access to the API resource based on the access token;
receiving, at the computing system, a request for access to a second resource, wherein the request includes the bearer token in a header of the request;
determining, by the computing system, the second resource is a world wide web (WEB) resource based on a second resource pattern;
validating, by the computer system, the bearer token, wherein the bearer token is validated based on the session identifier in the bearer token;
upon validation of the bearer token, creating, by the computing system, an authentication cookie, wherein the authentication cookie and the bearer token are tied together using the session identifier; and
providing, by the computing system, access to the WEB resource based on the authentication cookie, wherein the providing access to the WEB resource and the providing access to the API resource occur in the same session identified by the session identifier.

8. The method of claim 7, further comprising determining, by the computing system, that the user is authorized to access the WEB resource.

9. The method of claim 8, wherein the access token is a different token from the bearer token and does not include the session identifier.

10. The method of claim 9, wherein the validating the bearer token for access to the WEB resource is an implicit authenticate process of the user for access to the WEB resource and includes determining that the WEB resource is protected.

11. A system comprising:
one or more processors;
a memory coupled to the one or more processors, the memory storing a plurality of instructions executable by the one or more processors, the plurality of instructions comprising instructions that when executed by the one or more processors cause the one or more processors to perform processing comprising:
receiving a request for access to a first resource;
determining the first resource is a world wide web (WEB) resource based on a first resource pattern;
validating credentials of a user for access to the WEB resource, wherein the credentials are validated based on an authentication scheme associated with the WEB resource;
upon validation of the credentials:
creating an authentication cookie and a bearer token, wherein the authentication cookie and the bearer token are tied together using a session identifier; and
creating a session with the session identifier;
providing access to the WEB resource based on the authentication cookie;
receiving a call for access to a second resource, wherein the call includes the bearer token in a header of the call;
determining the second resource is an application programming interface (API) resource based on a second resource pattern;
validating the bearer token, wherein the bearer token is validated based on the session identifier in the bearer token matching the session identifier of the authentication cookie;
upon validation of the bearer token initiating a token exchange of the bearer token for an access token; and
providing access to the API resource based on the access token, wherein the providing access to the WEB resource and the providing access to the API resource occur in the same session identified by the session identifier.

12. The system of claim 11, wherein the processing further comprises determining, that the user is authorized to access the WEB resource.

13. The system of claim 12, wherein the access token is a different token from the bearer token and does not include the session identifier.

14. A non-transitory computer-readable memory storing a plurality of instructions executable by one or more processors, the plurality of instructions comprising instructions that when executed by the one or more processors cause the one or more processors to perform processing comprising:
receiving a first call for a bearer token;
validating credentials of a user for access to the bearer token, wherein the credentials are validated based on an authentication scheme associated with the bearer token;
upon validation of the credentials:
creating a bearer token, wherein the bearer token includes a session identifier; and
creating a session with the session identifier;
receiving a second call for access to a first resource, wherein the second call includes the bearer token in a header of the call;
determining the first resource is an application programming interface (API) resource based on a first resource pattern;
validating the bearer token, wherein the bearer token is validated based on the session identifier in the bearer token;
upon validation of the bearer token initiating a token exchange of the bearer token for an access token;

providing access to the API resource based on the access token;

receiving a request for access to a second resource, wherein the request includes the bearer token in a header of the request;

determining the second resource is a world wide web (WEB) resource based on a second resource pattern;

validating the bearer token, wherein the bearer token is validated based on the session identifier in the bearer token;

upon validation of the bearer token, creating an authentication cookie, wherein the authentication cookie and the bearer token are tied together using the session identifier; and providing access to the WEB resource based on the authentication cookie, wherein the providing access to the WEB resource and the providing access to the API resource occur in the same session identified by the session identifier.

15. The non-transitory computer-readable memory of claim 14, wherein the processing further comprises determining that the user is authorized to access the WEB resource.

16. The non-transitory computer-readable memory of claim 15, wherein the access token is a different token from the bearer token and does not include the session identifier.

17. The non-transitory computer-readable memory of claim 16, wherein the validating the bearer token for access to the WEB resource is an implicit authenticate process of the user for access to the WEB resource and includes determining that the WEB resource is protected.

18. A system comprising:
one or more processors;
a memory coupled to the one or more processors, the memory storing a plurality of instructions executable by the one or more processors, the plurality of instructions comprising instructions that when executed by the one or more processors cause the one or more processors to perform processing comprising:
receiving a first call for a bearer token;
validating credentials of a user for access to the bearer token, wherein the credentials are validated based on an authentication scheme associated with the bearer token;
upon validation of the credentials:
creating a bearer token, wherein the bearer token includes a session identifier; and
creating a session with the session identifier;
receiving a second call for access to a first resource, wherein the second call includes the bearer token in a header of the call;
determining the first resource is an application programming interface (API) resource based on a first resource pattern;
validating the bearer token, wherein the bearer token is validated based on the session identifier in the bearer token;
upon validation of the bearer token initiating a token exchange of the bearer token for an access token;
providing access to the API resource based on the access token;
receiving a request for access to a second resource, wherein the request includes the bearer token in a header of the request;
determining the second resource is a world wide web (WEB) resource based on a second resource pattern;
validating the bearer token, wherein the bearer token is validated based on the session identifier in the bearer token;
upon validation of the bearer token, creating an authentication cookie, wherein the authentication cookie and the bearer token are tied together using the session identifier; and
providing access to the WEB resource based on the authentication cookie, wherein the providing access to the WEB resource and the providing access to the API resource occur in the same session identified by the session identifier.

19. The system of claim 18, wherein the processing further comprises determining that the user is authorized to access the WEB resource.

20. The system of claim 19, wherein the access token is a different token from the bearer token and does not include the session identifier, and wherein the validating the bearer token for access to the WEB resource is an implicit authenticate process of the user for access to the WEB resource and includes determining that the WEB resource is protected.

* * * * *

UNITED STATES PATENT AND TRADEMARK OFFICE
CERTIFICATE OF CORRECTION

Page 1 of 1

PATENT NO. : 10,880,292 B2
APPLICATION NO. : 16/022068
DATED : December 29, 2020
INVENTOR(S) : Koottayi et al.

It is certified that error appears in the above-identified patent and that said Letters Patent is hereby corrected as shown below:

In the Claims

In Column 39, Line 17, in Claim 7, delete "credentials;" and insert -- credentials: --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*